United States Patent [19]

Buedel

[11] 3,729,715

[45] Apr. 24, 1973

[54] DIGITAL PROCESSING SYSTEM

[75] Inventor: Charles Kenneth Buedel, Wood Dale, Ill.

[73] Assignee: GTE Automatic Electric Laboratories Incorporated, Northlake, Ill.

[22] Filed: May 3, 1971

[21] Appl. No.: 139,480

[52] U.S. Cl. ....................340/172.5

[51] Int. Cl. ....................G06f 9/00

[58] Field of Search ....................340/172.5; 179/15 BF

[56] References Cited

UNITED STATES PATENTS

| | | | |
|---|---|---|---|
| 3,377,623 | 4/1968 | Reut et al. | 340/172.5 |
| 3,387,276 | 6/1968 | Reichow | 340/172.5 |
| 3,636,331 | 1/1972 | Amrehn | 340/172.5 |
| 3,593,312 | 1/1971 | Barton | 340/172.5 |
| 3,462,741 | 8/1969 | Bush et al. | 340/172.5 |
| 3,411,139 | 11/1968 | Lynch et al. | 340/172.5 |
| 3,376,554 | 4/1968 | Kotok et al. | 340/172.5 |
| 3,629,851 | 12/1971 | Werner | 340/172.5 |

*Primary Examiner*—Harvey E. Springborn
*Attorney*—K. Mullerheim, B. E. Franz and Theodore C. Jay, Jr.

[57] ABSTRACT

A register arrangement in a data processing system for controlling a telephone communication switching system includes a memory which is accessible on a time division multiplex basis to store call processing information and which is also accessible by a program-controlled computer processor on a random-access basis to perform processing functions, such as translation of dial digits to equipment location information. The memory can also be accessed on a random-access basis by a maintenance subsystem. Memory access logic circuits arrange and store information in the memory in the same manner in which information is stored in the local storage facilities in the data processor and the maintenance sub-system.

4 Claims, 14 Drawing Figures

Patented April 24, 1973

3,729,715

13 Sheets-Sheet 1

INVENTOR
CHARLES KENNETH BUEDEL

BY Bernard E. Franz

ATTORNEY

DUPLICATED SYSTEM RECONFIGURATION DIAGRAM

DIGITAL PROCESSING SYSTEM

BACKGROUND OF THE INVENTION

1. Field of the Invention

This invention relates to a register arrangement, and it more particularly relates to a register arrangement for a common control of a digital processing system.

2. Description of the Prior Art

Many electronic automatic telephone switching systems have been developed in order to realize advantages such as fast operation, small size, and easy maintenance as compared to electromechanical systems. These electronic systems can be divided into two categories, those in which the voice path switching is accomplished by means of a common highway with time division multiplex sampling of the voice signals, and those using crosspoint switching devices connected in matrix form in one or more stages. The crosspoint systems include small exchanges having approximately 100 lines and have control circuits such as registers and sequence switches which are individual to the connecting units such as links. In the larger crosspoint systems, the control circuits are time-shared by the connecting units. In this regard, a pool of registers are provided to store call processing information. Furthermore, in order to provide non-decimal selections, translation is usually provided in the systems. Translation is the conversion of called number information of the call processing information from the form in which it is received, for example, as decimal dial pulses, to non-decimal forms for switch control and other purposes.

In one prior art system, as disclosed in U.S. Pat. No. 3,408,628, the registers are program-controlled for storage of call processing information on a random-access basis, and translation is accomplished by a general purpose stored-program processor. For some applications, this type of system is not entirely satisfactory since the program for the relatively-expensive program-controlled registers need not be altered. In this regard, while the program for the general processor requires modification from time to time to accommodate changing data processing requirements, the program-controlled memory and its associated logic circuitry form a special purpose processor for processing the call processing information, which processing does not usually require modification even if the system requirements subsequently change. Thus, it would be highly desirable to have a wired-logic or hardware register arrangement which can be used to store call processing information and which can also be accessed on a random-access basis by other subsystems, such as a program-controlled processor for translating called number information. In this regard, it would be desirable to have such a wired-logic register arrangement which can be used for storing information received from other sub-systems on a random-access basis in the same manner in which the information is stored in the local storage facilities of the other subsystems.

SUMMARY OF THE INVENTION

Therefore, the principal object of the present invention is to provide a new and improved register arrangement for a digital processing system.

Another object of the present invention is to provide a hardware-controlled register arrangement which can be accessed on a random-access basis by other subsystems and which stores information in the same manner as the other sub-systems store information in their local memories.

Briefly, the above and further objects of the present invention are realized by providing a register arrangement which is adapted for use in a digital processing system and which includes a pool of registers. The pool of registers includes electronic apparatus shared on a time division multiplex basis, and each register includes a ferrite core storage element array, which is used with the electronic apparatus in a recirculating arrangement to store call processing information on a time division multiplex basis. Each one of the arrays of storage elements of a register includes several word stores of ferrite core storage elements in the memory. The word stores of a register in the memory are provided with a time slot, and the time slot of each register is divided into several sub-time slots corresponding to memory locations, each of which comprises a plurality of groups of storage elements for storing a plurality of information words. In the disclosed embodiment of the present invention, each memory location comprises two word stores of a register in the memory for storing two separate information words, and the format of each information word stored in the register is the same as the format of the words stored in the local storage facilities of the data processor and the maintenance sub-system. Thus, while the registers are receiving and storing call processing information on a time division multiplex basis, the computer processor or the maintenance subsystem can access the registers on a random access basis.

According to another feature of the present invention, the computer processor and the maintenance subsystem access the registers in accordance with a predetermined priority scheme. Also, the electronic register apparatus generates interrupt signals, such as request-for-translation interrupt signals for the computer processor, to provide a call for service.

BRIEF DESCRIPTION OF THE DRAWING

The above-mentioned and other objects and features of this invention and the manner of attaining them will become apparent, and the invention itself will be best understood, by reference to the following description of an embodiment of the invention taken in conjunction with the accompanying drawings, wherein.

DESCRIPTION OF THE PREFERRED EMBODIMENT

The system is explained according to the following outline:

A. GENERAL SYSTEM DESCRIPTION
  1. Line Group
  2. Selector Group
  3. Trunk-Register Group
  4. Originating Marker
  5. Terminating Marker
  6. Register Sender
  7. Data Processor Unit
  8. Maintenance and Control Center
  9. Trunk Circuits
B. TYPICAL CALL
C. REGISTER SENDER
D. DUPLICATED SYSTEM
E. REGISTER SENDER MEMORY CONTROL — DETAILED DESCRIPTION
  1. Symbolism
  2. Memory Arrangement
  3. Register-Sender Timing
  4. Memory Access
  5. Priority Control
  6. Configuration
  7. Interrupts
F. MEMORY CONTROL OPERATION
  1. Access Time A1 — Maintenance Controller Request
  2. Access Time A1 — Without RMN Request
  3. Access Time A2
  4. Access Time A4
  5. Access Time A5
  6. Access Time A3 — Sub-time Slot Y1
  7. Access time A3 — Sub-time Slot Y2
  8. Access Time A3 — Computer Processor Syncing

A. GENERAL SYSTEM DESCRIPTION

Figure 1:
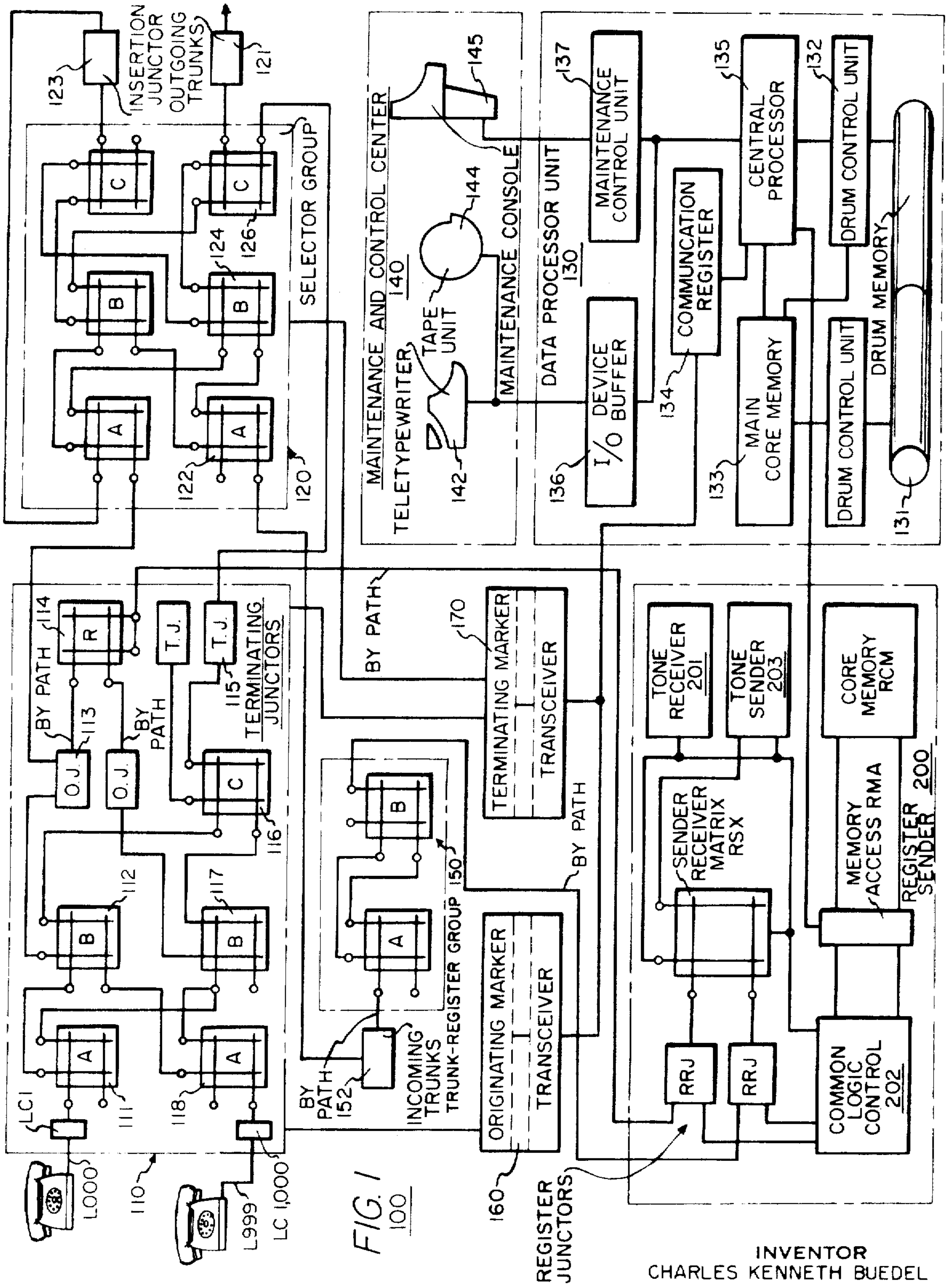
FIG. 1 is a block diagram of a telephone switching exchange.

Referring now to FIG. 1 of the drawings, there is shown a system 100 which incorporates the principles of the present invention and which comprises a line group 110, a selector group 120, a data processor unit 130, a maintenance and control center 140 for the data processor unit, a trunk-register group 150, an originating marker 160, a terminating marker 170, and a register sender 200. The line group 110 includes reed-relay switching networks A, B, C and R for providing local lines L000 to L999 with a means of accessing the system 100 for originating calls and for providing a means of terminating calls destined for local customers. The trunk-register group 150 also includes reed-relay switching networks A and B to provide access to the system 100 for incoming trunks 152 from distance offices, and to route trunk calls through the system to local customers or to outgoing trunks 120 to distance offices. The selector group 120 forms an intermediate switch and may be considered the call distribution center of the switching system 100. The selector group 120 routes calls appearing on its inlets to appropriate destinations, such as local lines or other offices represented by outgoing trunks, by means of reed-relay switching networks A, B and C. Thus, the line group 110, the trunk-register group 150, and the selector group 120 form the switching network for the system 100 and provide full-metallic paths through the office for signaling and transmission.

As seen in FIG. 1, the originating marker 160 provides high-speed control of the switching networks to connect the calls entering the system 100 to the register sender 200. The terminating markers 160 control the switching networks of the selector group 120 for establishing connections therethrough. If a call is to be terminated on a customer's line within the office, the terminating marker 170 sets up a connection through both the selector group 120 and the line group 110 to the customer's line.

The register sender 200 provides for receiving and storing of incoming digits, and for outpulsing digits to distant offices, when required. Incoming digits in the dial pulse mode, in the form of touch calling multi-frequency signals from local lines, or in the form of multi-frequency signals from incoming trunks are accommodated by the register sender 200. A group of register junctors RRJ provides an interface for the incoming digits which are transferred to tone receivers 201 via a sender-receiver matrix RSX. A ferrite-core memory RCM stores the digital information via a memory access circuit RMA under the control of a common logic control 202. Digits may be outpulsed by dial pulse generators or multi-frequency senders 203, which are selectively connected to the register junctors RRJ via the sender-receiver matrix RSX. The common logic control 202, the memory access RMA, and the core memory RCM form the register apparatus of the present invention, and provide a pool of registers for storing call processing information received via the register junctors RRJ. The information is stored in the core memory RCM on a time division multiplex basis, and the memory RCM can be accessed by other subsystems, such as the data processor unit 130 on a random access basis.

The data processor unit 130 provides stored-program computer control for processing calls through the system 100. Instructions provided by the unit 130 are utilized by the register sender 200 and other subsystems for processing and routing of the call. The unit 130 includes a drum memory 131 for storing, among other information, the equipment number information for translation purposes. A pair of drum control units, such as the unit 132 cooperate with a main core memory 133 and control the drum 131. A central processor 135 accesses the register sender 200 and communicates with the main core memory 133 to provide computer control for processing calls through the system 100. A communication register 134 transfers information between the central processor and the originating markers 160 and the terminating markers 170. An input/output device buffer 136 and a maintenance control unit 137 transfer information from the maintenance and control center 140.

The maintenance and control center 140 provides a centralized facility for interfacing between the attendant and the system equipment. The center 140 provides displays and alarms to monitor system operation, and includes input-output devices, such as a teletypewriter 142, tape punch and tape reader unit 144, and a maintenance console 145, which cooperates with the maintenance control unit 137 of the data processor unit 130.

A(1) — Line Group

The line group 10 is an equipment group which enables lines L000 to L999 to access the system 100. The line group 110 is also the equipment group from which lines L000 to L999 are accessed. In step-by-step electromechanical systems, each line has a dual appearance, one at a linefinder for originating calls and the other at a connector for receiving calls. In the system 100 of the present invention, customer lines have only one appearance which is at the line group for both originating and receiving calls.

The line group 110 may be considered to be a large switching network which provides two-way switching to 1,000 lines. For larger size offices, such as a 10,000 line exchange, additional line groups and other equipment are provided. On an originating call, the line group 110 provides concentration from 1,000 lines to 140 originating junctors. Each originating junctor provides a split between calling and called parties while the call is being established, thereby providing a separate path for signaling. On a terminating call, the line group 110 provides expansion from 120 terminating junctors to 1,000 lines being served. The terminating junctors provide ringing control, battery feed, and line supervision for calling and called lines. Crosspoint switching networks, such as A network 111 and B network 112, are switching matrices and form a full-metallic path for signaling and transmission.

The line group 110 also includes line circuits LC1 to LC1,000, which are individually associated with the lines L000 to L999. The line circuits LC1 to LC1,000 each include line and cut-off reed relays to provide a call-for-service on an originating call, to mark the line busy on an originating or terminating call, and to remove the attachments from the line on a terminating call.

The line matrices are arranged in four stages — A, B, C and R. The crosspoints used in the A, B and C stages are two-winding four-contact reed relay crosspoints. The R stage crosspoints are two-winding 10-contact crosspoints. The line matrices establish connections to the originating junctors and the register junctors RRJ of the register sender 200 from the lines L000 to L999 connected to their inlets for originating calls. The line matrices also establish connections to terminating junctors 170 to the lines L000 to L999 on terminating calls.

The A and B stages provide paths to the originating junctors and provide concentration from 1,000 line inlets to 140 originating junctors. The R stage provides a temporary connection between the originating junctor and the register junctor RRJ on originating calls.

The A, B, and C stages provide paths from terminating junctors for terminating calls. Both originating and terminating calls are connected through the A and B stages, with separate outlets being provided on the B stage to originating junctors and C stages for handling each type of call. The C stage operates during terminating calls only, and provides a matrix that distributes the traffic from 120 terminating junctors to all parts of the A and B stages. This traffic is then expanded to a maximum of 1,000 line inlets.

An originating junctor is used for every call originating from a local line, and remains in the connection for the duration of the call. The originating junctor extends the calling line's signaling path to the register junctor RRJ in the register sender 200, and at the same time provides a separate signaling path from the register sender to the selector group 120 for outpulsing, when required. The originating junctor isolates the calling line until cut-through is effected, at which time the calling party is switched through to the selector group inlet. The originating junctor also provides line lockout.

A terminating junctor is used for every terminating call and remains in the connection for the duration of the call. Its functions include ringing control, battery feed, and line supervision for calling and called lines. The terminating junctor allows three optional ringing arrangements: (a) single party; single-frequency with generator connected to the negative side of the line, (b) two party-single-frequency divided, or single-party bridged or divided, and (c) four party; two-frequency divided, or two-party bridged or divided.

There is provided a connect and access circuit (not shown) which is associated with the line matrices of the line group 110. The purpose of this circuit is to provide a means for connecting a marker to a matrix or a junctor to permit the marker to manipulate them, to perform tests on them, and to receive information from them.

A(2) — Selector Group

The selector group 120 is an equipment group which provides intermediate mixing and distribution of the traffic from various trunks and junctors on its inlets to various trunks and junctors on its outlets. The outlets of the selector group 120 are arranged so that a path may be selected to one of a group of equipment on its outlets. Line groups are connected to a plurality of outgoing trunks 121 or other line groups through the selector group 120, and a plurality of incoming trunks 152 are connected to line groups or outgoing trunks through the selector group. An analogy may be made between the functions of the selector group 120 of the system 100, and those of selector switches of the electromechanical step-by-step system.

The selector group 120 comprises a selector matrix, such as the A stage 122, to provide the signaling and transmission paths, and connect and access equipment (not shown) which controls the selector group 120 in response to the terminating marker 170. The crosspoints used to form the switching network in the selector group 120 are two-winding four-contact reed relays.

The selector matrix comprises three switching stages — A, B, and C. The function of the three-stage selector matrix is to interconnect the originating junctors, the incoming trunks, and special local facilities, such as the insertion junctor 123, with the terminating junctors, the outgoing trunks 121, intertoll, EAS, toll terminating, and special local facilities on a "fan-out" basis.

The connect and access circuit (not shown) associated with the selector matrix of the group selector provides a means for connecting the terminating marker 170 to a matrix to control the matrix, to permit the marker to perform tests on it, and to receive information from the matrix. Only the terminating marker 170 can access the selector matrix.

A(3) — Trunk-Register Group

The trunk-register group 150 provides access to the system 100 from the group of incoming trunks 152, or special feature junctor circuits (not shown). The trunk-register group 150 also provides a bypath for, and concentration from, the special feature junctor circuits to the register junctors RRJ in the register sender 200.

The trunk-register group comprises a two-stage, trunk-register matrix to provide the signaling and transmission paths, and connect and access circuitry (not shown) which controls the matrix of the trunk-register group in response to the terminating marker 170.

The trunk-register matrix provides a signaling path from the distant party, via the associated trunk or junctor to the register junctor RRJ, and a signaling path between the register junctor RRJ and the selector group 120. Thus, the trunk-register matrix provides the connection for the trunk or junctor to the register junctor RRJ during sending and receiving of dial pulse or tone signaling.

A(4) — Originating Marker

The markers used in the system 100 are electronic units which control the selection of idle paths and the establishment of connections through the matrices. The originating marker 160 detects calls for service in the line and/or trunk-register group 150, and controls the selection of idle paths and the establishment of connections through these groups. On line-originated calls, the originating marker 160 detects calls for service in the line matrix, controls path selection between the line and originating junctors, and between originating junctors and register junctors. On incoming trunk calls, the originating marker 160 detects calls for service in the incoming trunks connected to the trunk-register 150 and controls path selection between the incoming trunks 152 and register junctors RRJ.

A(5) — Terminating Marker

The terminating marker 170 controls the selection of idle paths and the establishment of connections for terminating calls. The terminating marker 170 controls the establishment of all calls through the selector matrix of the selector group 120 and, in the case of a call terminating on a local line, establishes connections through the line matrix of the line group 110.

The terminating marker 170 closes a matrix access circuit (not shown in the drawings) which connects the terminating marker to the selector group 120 containing a call for service, and if the call is terminating on a local line, the terminating marker 170 closes another access circuit (not shown) which in turn connects the marker to the line group 110. The marker connects an inlet of the selector group 120 to an idle junctor or trunk circuit. If the call is to a local line, the terminating marker selects the idle terminating junctor and connects it to a line group inlet, as well as connecting it to a selector group inlet. For this purpose, the appropriate idle junctor is selected and a path through a line group 110 and the selector group 120 is established.

A(6) — Register Sender

The register sender 200 is a time-shared common control unit with the ability to register and process 192 calls simultaneously from local lines or incoming trunks. The register sender 200 provides the electronic time-shared register apparatus for receiving and storing incoming digits, and pulse generating sender circuitry to forward a call toward its destination. In this regard, the register sender 200 generally includes a plurality of register junctors RRJ which are space-divided electromechanical access circuits for providing an interface between the switching matrices of the system 100 and the time-shared register apparatus, which includes the electronic logic of a common logic control 202, a ferrite-core memory RCM to store digits to be received and sent via the register junctors RRJ, and supervisory information pertaining to the call under the control of the common logic control 202 via a memory access RMA. A sender-receiver matrix RSX selectively connects a plurality of tone receivers 201 and senders 203 to the register junctors RRJ for signaling modes other than the dial pulse mode which is provided for by the register junctors RRJ.

The time-shared common logic control 202 of the register sender 200 is duplicated and runs identical operations in synchronism with one another. Under normal conditions, both sets of time-shared equipment are partially active, one set serving one-half of the register junctors RRJ and the other set serving the remaining half of the register junctors RRJ. In case of equipment faults, either set of time-shared equipment can serve all of the register junctors RRJ.

The space-divided equipment of the register sender 200 includes the register junctors RRJ, the senders and receivers, and the sender-receiver matrix RSX. The register junctors RRJ with their associated multiplex equipment (not shown) provide an interface between the space-divided matrix outlets connected to the register junctors RRJ and the time-shared common logic control 202. The sender-receiver matrix RSX provides a concentration of the traffic from the register junctors RRJ to the tone senders and receivers under the control of the common logic control 202. The senders 203 provide for sending in the multi-frequency mode, and the receivers provide for receiving in either the touch-calling multi-frequency mode from the local lines or the multi-frequency mode from the incoming trunks 152.

The register junctors RRJ are the entry and exit point of the register sender 200 for information transferred between the switching network and the register sender. The register junctors enable the register sender to provide the following features: dial pulse receiving and sending, coin and party testing, line busy, and dial tone and reorder tone application. The incoming and outgoing matrix paths are held by the register junctors RRJ during call processing. The register junctors comprise electromechanical components for compatibility with lines, trunks, and switching network circuits, however they also include electronic interfacing circuits which are similar to those in the markers for compatibility with the electronic common logic control 202. Signals from lines, trunks, and network circuits are received by the register junctors and forwarded to the common logic control for processing.

The common logic control 202 contains the control logic for call processing by the register sender 200. The purpose of the common logic control 202 is to perform all functions associated with receiving, sending, and timing of digits, and to control processing of calls by generating commands for other circuits in the register sender and for the switching network. Since the common logic control 202 operates on a time-shared basis to store call processing information in the memory RCM, the common logic control 202 has the ability to register and process 192 simultaneous calls. The common logic control works closely with the core memory RCM which together form the register apparatus of the present invention, and which provides storage of information concerning the calls in progress and information relating to the data processor unit 130.

The core memory RCM is a conventional ferrite core memory, which need not be disclosed in detail. The memory RCM automatically restores the information in the same cores after a read operation, and it likewise automatically clears the information from the cores immediately prior to writing information into them. It is to be understood that the memory RCM could also be any suitable type of non-destructive read-out memory.

A(7) — Data Processor Unit

The data processor unit 130 is the central coordinating unit and communication hub for the system 100. The data processor unit 130 is in essence a general-purpose computer with special input-output and maintenance features which enable it to process data.

The call processing operation includes control of: the originating process communication (receipt of line identity, etc.), the translation operation, route selection, and the terminating process communication. The translation operation includes: class-of-service look-up, inlet-to-directory number translations, matrix outlet-to-matrix inlet translation, code translation, and certain special feature translations. The maintenance operations include: monitoring the system for trouble conditions, trouble access to system units, routining, storage of information about certain calls being established, trouble diagnosis, and print-out. Traffic operations include: monitoring equipment usage and overloads, providing the proper response to relieve overload conditions, and providing a means to measure the quality of service.

The data processor unit has the capability to handle traffic generated by 20,000 lines, and in so doing, assembles information that is received from markers and the register sender 200 into a series of call processing instructions which are sent to the markers and register sender to provide for processing of service demands throughout the system 100. Storage is also provided for a directory number group consisting of 25,000 blocks of numbers which can be associated with up to a maximum of 16 different office codes. A library is maintained of semi-permanent information concerning each line inlet's classification, and of tables for use in translating customer or machine pulse information into switching instructions. There is also maintained a library of semi-permanent information concerning the grading of the office and the connection of all trunks and junctors, and a library of semi-permanent instructions which are utilized for automated diagnosis and maintenance of all portions of the system essential to call processing. Required traffic monitoring functions for calls handled by the system 100 are performed by the unit 130.

The data processor unit 130 is a high-speed digital computer which is designed for high availability and to allow the system to expand in both features and additional equipment. This is accomplished through the inherent flexibility of the stored program and the orderly expansion of the data processor 130 with use of modular design. Through the use of its stored-program capability, the data processor unit 130 is used in call processing for making high-speed translations. It is also used to control the communications between all subsystems.

Another important function of the data processor unit 130 is in the area of maintenance for the entire system 100. By utilizing its stored-program capability, the data processor unit recognizes error conditions in other sub-systems, isolates the error to a particular sub-system, removes it from service and assists in locating the error to a minimum of replaceable plug-in modules. The data processor unit also provides for communication with other central office equipment such as ticketers, routiners, and call metering equipment.

The central processor 135 is the central control unit of the data processor unit 130 and is used to obtain program instructions stored in the main memory 133, interpret each instruction, and perform the necessary operations specified by the instruction. The main memory 133 is a ferrite-core memory and stores the system control program which is an executive program, and call processing programs whose frequency of usage requires that they be locally available.

The drum memory 130 provides mass storage for translation data, diagnostic programs, tables, and other information. The pair of drum control units provide control for translating information between the main core memory 133 and the drum memory 131.

A(8) — Maintenance and Control Center

The maintenance and control center 140 serves as a centralized facility for interfacing between the operating personnel and the switching system 100. The center 140 serves as the focal point for monitoring system and sub-system operation, exercising manual controls, initiating test call routines and test programs, and providing print-out of maintenance information. Additionally, the maintenance and control center 140 provides a visual indication of all traffic conditions along with sufficient control for switch management.

The maintenance and control center 140 also provides the interface for use of optional remote test equipment to provide compatibility with other testing in the exchange area. The remote test equipment would be used to provided for testing of lines served by an office located beyond the supervisory limits of the local test trunks in the main office.

A(9) — Trunk Circuits

The system 100 includes a group of six trunk circuits and three trunk circuit adapters. These trunk circuits interface with all commonly used existing trunk facilities. The six standard trunk circuits are as follows:

a. local trunk circuits
1. incoming, loop or E&M
2. outgoing, loop, or E&M, automatic-to-automatic
3. outgoing, loop, automatic-to-manual b. local and tandem trunk circuits
1. incoming, loop or E&M
2. outgoing, loop, or E&M, automatic-to-automatic 3. two-way, E&M, automatic-to-automatic
c. trunk adapters
1. test and verification adapter
2. E&M coin adapters
3. loop coin adapters.

B. TYPICAL CALL

As an introduction to the system operation, a brief description of a typical local call as processed through the system 100 is now presented.

Referring now to FIG. 1, assume that the subscriber on line L000 initiates a call by lifting his handset. The line group originating marker 160 then detects the originating call mark, identifies the calling line, and selects an idle register junctor RRJ within the register sender 200. A path is them temporarily established from the calling telephone L000 to the selected register junctor via A matrix 111 and B matrix 112 in tandem in the switching network of the line group 110 through one of the originating junctors such as the junctor 113, and a crosspoint in the R matrix 114, whereby the subscriber receives dial tone. The dialed digits are stored temporarily and coded, and the process is continued as the digits are transferred to the data processor unit 130, which analyzes the information for type of originating call and selects instructions from the drum memory 131. The instructions are transmitted to the register sender 200 which in turn transfers the information via one of the senders 203 to the originating junctor 113 for analysis by the originating marker 160. In the case of trunk calls the communication register 134 of the data processor unit 130 communicates directly with the terminating marker 170 to directly establish the terminating portion of the call without the use of the senders of the register sender 200. In a local call, the instructions received by the terminating junctors, such as the terminating junctor 115 from the senders of the register sender 200 are analyzed by the terminating marker 170 which causes the selector group 120 to establish a path via crosspoints in the A matrix 122, the B matrix 124 and the C matrix 126 of the selector group 120 to the idle terminating junctor 115. The remaining instructions are followed by the terminating marker 170 to locate the called line terminal, such as the line L999, select and seize a path from the terminating junctor 115 through the crosspoints of C matrix 116, B matrix 117 and A matrix 118 of the line group 110 in tandem to the called line. The terminating junctor 115 establishes ringing, answer supervision, and talking battery for both parties when the call is answered.

The system 100 is a common control operation, and thus the markers of the line group 110 and selector group 120 function only to serve the assigned portion of the call processing and are then released to serve other calls. The register sender 200 and the data processor unit 130 are functioning on a time division basis and therefore are processing several calls simultaneously. The temporary signaling and control paths are released for further service while only the talking paths are held through the switching matrices and junctors in FIG. 1.

C. REGISTER SENDER

Figures 2, 14:
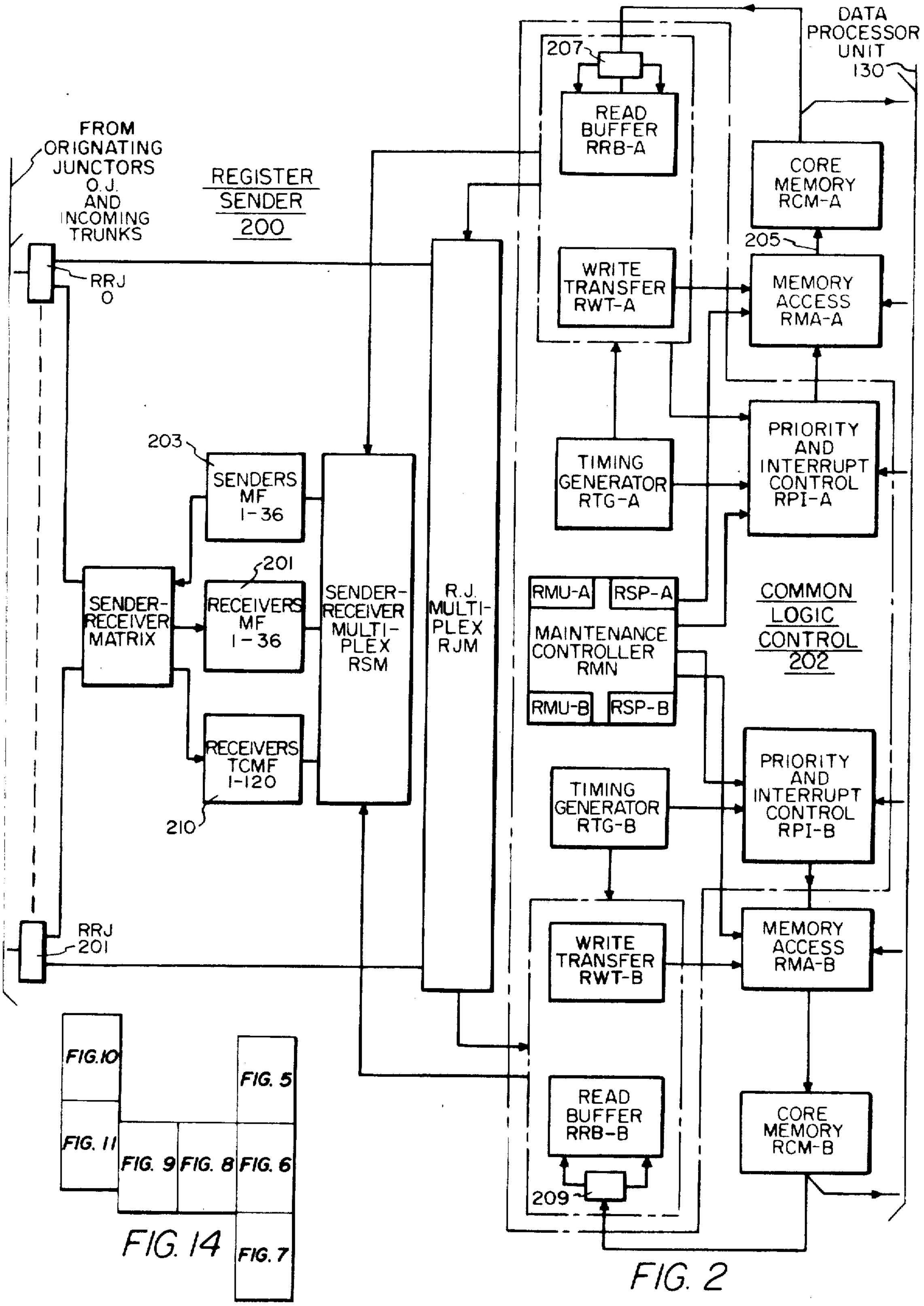
FIG. 2 is a block diagram of the register sender for the exchange of FIG. 1.
Figure 3:
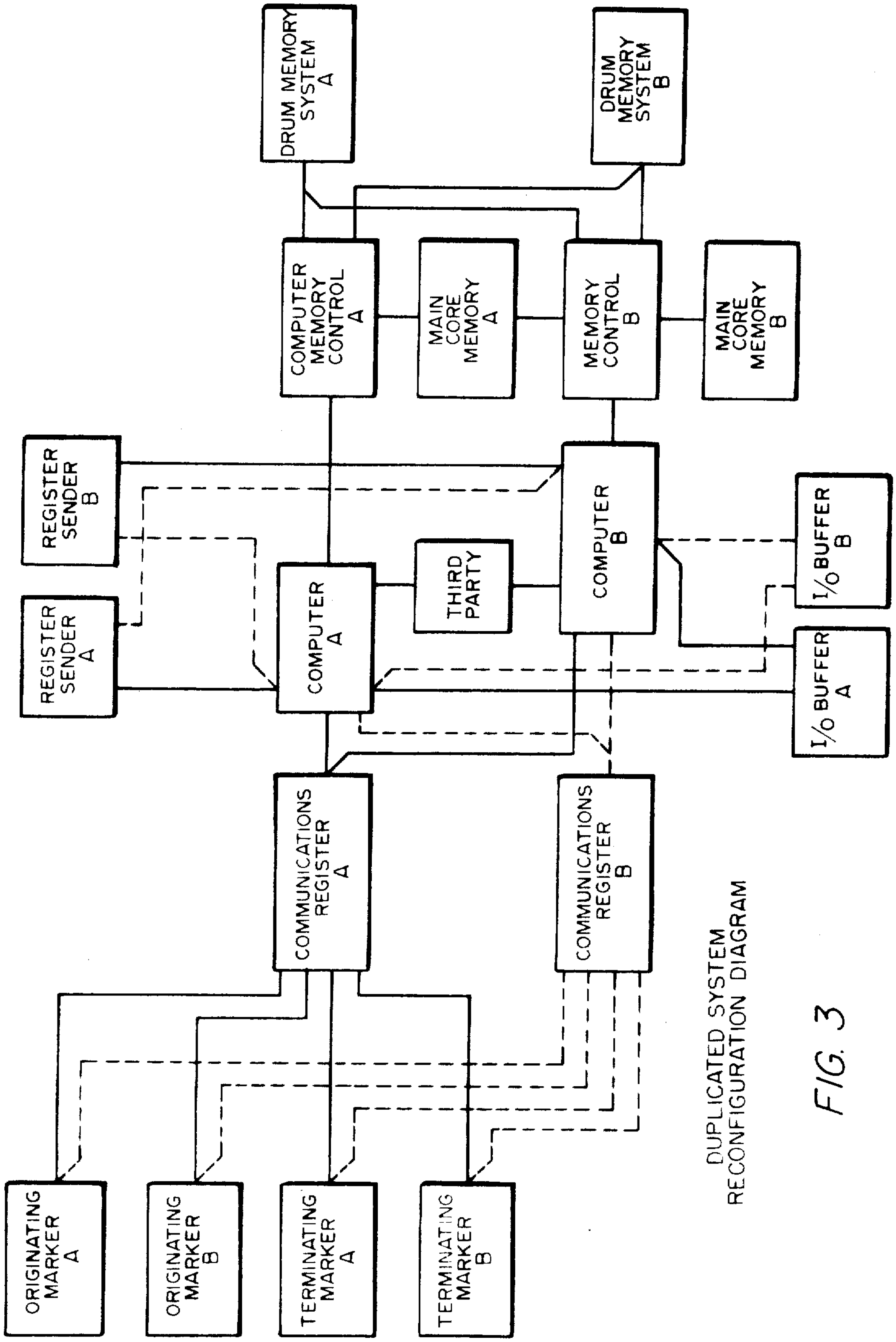
FIG. 3 is a block diagram of a portion of a duplicated version of the telephone switching exchange of FIG. 1.

Referring now to FIG. 2 of the drawings, the register sender 200 includes a register junctor multiplex RJM which is multiplexing circuitry for gating information between the register junctors RRJ and the common logic control 202. A sender-receiver multiplex RSM is provided for transferring information between the common logic control 202 and the senders and receivers on a time division multiplex basis. The register sender 200 includes 36 multi-frequency senders 203, 36 multi-frequency receivers 201, and 120 touch calling multi-frequency receivers 210, which are selectively connected to the register junctors via the sender-receiver matrix RSX.

The common logic control 202 includes duplicated pairs of electronic logic units. In this regard, the common logic control 202 comprises a duplicated pair of central control units RCC-A and RCC-B, a duplicated pair of priority and interrupt control units RPI-A and RPI-B, a duplicated pair of timing generator units RTG-A and RTG-B, and a maintenance controller RMN which includes a duplicated pair of sub-units RMU-A and RMU-B and another duplicated pair of sub-units RSP-A and RSP-B. The units are provided in duplicate for reliability purposes, and each of the duplicated units functions independently as described hereinafter in greater detail. Each of the central control units RCC-A and RCC-B includes a respective write transfer RWT-A and RWT-B for writing information into the respective core memories RCM-A and RCM-B and a respective read buffer RRB-A and RRB-B for temporarily storing information received from the respective core memories RCM-A and RCM-B as a result of read operations. The read outputs of the memories RCM-A and RCM-B are also connected in multiple to the data processor unit 130 so that the unit 130 can access the memories RCM-A and RCM-B and directly receive the results of the interrogation. Two words are read from two memory word stores of each of the memories during a single sub-time slot, and thus a pair of steering logic circuit units 207 and 209 direct the two words to two separate storage areas in the respective read buffers RRB-A and RRB-B. In this regard, the read buffers are 52-bit registers, each of which comprises 52 latch circuits and associated logic circuits.

The priority and interrupt control units RPI-A and RPI-B receive requests for register-sender memory access from the respective register timing generator units RTG-A and RTG-B, the maintenance controller RMN, and the data processor unit 130, and select the proper unit for read or write access of the memories according to a predetermined order of priority. They also generate interrupts, such as the request-for-translation interrupt.

The memory access circuits RMA-A and RMA-B are controlled by the priority and interrupt control units RPI-A and RPI-B, respectively. The memory access units are multiplexing units and provide data paths for writing from each write transfer circuit into its associated memory, or for writing to either or both memories from the data processor unit 130 or from the maintenance controller RMN.

The register timing generators RTG-A and RTG-B provide the control signals which drive the common logic control 202 and memories RCM-A and RCM-B, respectively, in the time division mode. Each of the register timing generators consists of a set of electronic counters driven by a 10MHz system clock to generate the control signals. Each of these units produces pulses which consist of:

a. a 10-millisecond system cycle time;

b. the overall cycle (10ms) divided into 202 time slot pulses (49.5 μs each), 192 of which are used for call processing and 10 of which are reserved for maintenance purposes;

c. each time slot pulse divided into 11 sub-time slot pulses (5.5 μs each), nine of which are utilized during each time slot pulse;

d. each sub-time slot pulse divided into 55 pulses (0.1 μs each), and e. other miscellaneous timing functions.

The core memories RCM-A and RCM-B provide temporary storage for all information pertaining to the 192 possible simultaneous calls being processed. Each one of the 49.5-microsecond time slot pulses appearing every 10 milliseconds corresponds to a specific group of memory locations of a register. Each register junctor RRJ is permanently assigned to a register which includes eight memory locations, each memory location comprising word stores (word stores) of memory cores for storing two separate words. Each one of the sub-time slot pulses corresponds to a specific memory location.

Each memory location stores two 26-bit words in two separate word stores of cores. Twenty-four bits of each 26-bit word are 24 information bits regarding the call in progress. One bit is a parity bit, and the remaining bit is a spare.

Note that a word store comprises a set of 26 cores which are addressed together, while a memory location is defined herein as comprising two word stores.

D. DUPLICATED SYSTEM

FIG. 2 is a simplified block diagram showing in broad scope how subsystems are duplicated and how the system may be reconfigured. Reconfiguration is the removal of a malfunctioning subsystem. When a malfunction is detected and isolated the system must be reconfigured in order to continue normal call processing. Any single subsystem of a pair can be removed from call processing without seriously degrading service. Both subsystems of a pair must not be removed from call processing; since this would result in the system being out of service. The system can continue call processing with only one subsystem of each pair functioning.

Normally computer A and computer B operate in synchronism, and at particular intervals during each clock cycle which is related to the access of a word of memory, certain points of the systems are compared and the comparison is monitored by the third party circuit. The third party circuit contains logic enabling it to control the reconfiguration of the system, and to perform functions such as controlling one of the computers to analyze the other.

The register sender subsystems A and B in like manner are operated in synchronism and certain points of the systems compared during each cycle. Normally register sender A communicates with computer A and register sender B communicates with computer B. One of the computer-register sender combinations supplies output signals to other subsystems of the system. The system may be reconfigured so that either computer-register sender combination supplies the output signals, or for example computer A may communicate with register sender B to supply output signals or computer B may likewise work with register sender A.

The two computer subsystems A and B as a pair may work with either of the drum memory systems, or if one computer is out of service the other computer may work with either drum memory system. The computer and the drum memory system each access the main core memory via the computer memory control.

The originating markers A and B are arranged to process calls simultaneously, with the limitation that they cannot both be working with the same network matrix. They have an interlock arrangement such that any given call request will be serviced by only one of the originating markers. The terminating markers A and B are arranged so that only one may be serving calls at a time, but they are used alternately. There is also an interlock arrangement to prevent originating and terminating markers from accessing the matrices simultaneously. The communication registers A and B are arranged so that one of them is on line, for example, the communication register A, while the other is on standby. For example, when communication register A is on line communication register B is in standby. Both computers work with the communication register which is on line.

In like manner the input-output buffers A and B have one on line while the other is in standby, and both computers work with the one which is on line.

E. REGISTER SENDER MEMORY CONTROL — DETAILED DESCRIPTION

(1) Symbolism

In various parts of the system 100 logical AND gates and OR gates are used and are implemented with NAND gates. NAND gates are transistor logical elements which have outputs that can either be considered to be AND function of its inputs followed by an inversion, or which can be considered to be an OR function of the negation of its inputs. Therefore, the AND gates and the OR gates shown throughout the system 100 are entirely implemented with NAND gates. The electronic units are shown in the drawings as having any number of input and output loads, but in actual implementation these would be limited by loading requirements well known in the art. Moreover, it should be understood that any type of implementation of the logic gates disclosed herein may be used as is well known in the art.

A NAND gate having all of its inputs true produces a false output signal and if any one of the inputs is false, the output is true. Throughout the system 100 a true signal condition is indicated by a positive potential, and a false condition is indicated by ground.

The system 100 is also implemented with a bistable logical device known as a latch circuit. The latch circuit is a sequential logic circuit which is used for temporarily storing information and is similar to a flip-flop circuit. Moreover, it is to be understood that other types of bistable devices, such as flip-flops, can be employed in the system 100 in place of the latch circuits. The latch circuits used in the system 100 include a pair of NAND gates. Each of the outputs of the NAND gates is coupled back to an input of the other NAND gate. As a result, the output of one of the NAND gates serves as the true output of the latch gate, and the inputs to that NAND gate serve as the set inputs to the latch circuit. The inputs to the other NAND gate of the latch circuit serve as the reset inputs to the latch circuit, and the output of that NAND gate serves as the false output of the latch circuit.

Each of the units of the register sender is designated by three letters, the first of which is an R. Each of the units of the data processor unit is designated by a three letter designation, the first letter of which is a C, for example CCP.

(2) Memory Arrangement

The core memory RCM of the register sender 200 is a ferrite core memory array which provides temporary storage for the register sender and is sequentially accessed and time slot oriented. The core memory RCM temporarily stores the call processing information, translation request and trouble call information, and maintenance information for the maintenance controller RMN. The central control RCC processes calls on a time division multiplex basis by receiving information from the register junctors RRJ during separate time slots, and therefore the central control RCC accesses the core memory RCM via the memory access RMA on a time division multiplex basis during time slots corresponding to the register junctors RRJ. The data processor unit 130 accesses the core memory RCM on a random access basis for the purpose of communicating translation information to the register sender 200 and for maintenance purposes. Thus, the core memory RCM is compatible with both the data processor unit 130 and the central control RCC in word length and operation. Moreover, the maintenance controller RMN of the register sender 200 accesses the core memory RCM via the memory access RMA on a time division multiplex basis for maintenance purposes, and thus the core memory RCM is compatible with the maintenance controller RMN and both the central control RCC and the data processor unit 130.

The ferrite core memory array of the core memory RCM is sequentially accessed and time slot oriented with respect to the central control RCC, but the ferrite core memory array is random accessible relative to the data processor unit 130 and the maintenance controller RMN. Each register is assigned 16 information words which are stored in 16 separate word stores of the memory array. However, two words are sequentially accessed during each sub-time slot by the central control RCC as hereinafter described in greater detail. Each memory word is 26 bits in length and corresponds to the words stored in the local memory for the data processor unit 130 and the maintenance controller RMN of the register sender 200.

There are 202 registers, 192 of which store information for the register junctors RRJ 0–201. In this regard, register junctors RRJ 0 to 191 and their associated registers are used for call processing information received from subscriber lines, and registers 192 to 201 are used for maintenance purposes for the register sender 200. There are also additional storage elements in the core memory RCM, but the additional storage elements are not associated with register junctors and are referred to as dedicated cores. In this regard, two additional registers consisting of dedicated cores are provided and have an address designated as 202 and 203. Each dedicated core register includes storage for 16 words of information. The dedicated core register 202 stores system interrupt information which is hereinafter described in greater detail, and the address of the currently scanned register which is scanned on a time division multiplex basis and which corresponds to one of the 202 registers 0 – 201 as hereinafter described in greater detail. The register 203 stores the information for the maintenance controller RMN and stores the information referred to as "snapshot words" which refer to the information in one of the registers 0 to 201 which is analyzed by the maintenance controller RMN.

The registers which are associated with the register junctors are accessed on a time division multiplex basis by the central control RCC of the register sender 200 to store the call processing information from the subscriber lines via the register junctors. The call processing information includes data, such as the dialed digits, and also control information. During a single sub-time slot of a register, two word stores of each register are accessed by the central control RCC. In this regard, two words are sequentially read from the memory, and then recirculated to the read buffer RRB of the central control RCC for modification, if any. After modification, if any, the write transfer RWT writes the two words sequentially into the same locations in the memory RCM via the memory access RMA. Thus, during each sub-time slot, two word stores of the register are sequentially accessed. Thus, the core memory RCM undergoes a read/read and then a write/write operation during a single sub-time slot. Moreover, during the same sub-time slot, after the read/read operation and before the write/write operation, the data processor unit 130 or the maintenance controller RMN can access the memory RCM in accordance with a given priority system.

In regard to the information stored in the dedicated cores for the data processor unit 130 and the maintenance controller RMN, the following is a list of the information stored in the dedicated cores:

a. one Translation Interrupt word address, b. one System Trouble Interrupt word address, c. one register junctor RRJ Scan Position word address used to transfer the currently-scanned RRJ address to the data processor unit 130 for the software lockout, e. 16 words used to transfer maintenance information to the data processor unit 130 at the time a fault is detected by the RS register sender 200.

The location of the miscellaneous words stored in the dedicated cores of the core memory RCM are as follows:

a. RRJ Scan Position word is located at register address 202/word 0, b. the Translation Interrupt word is located at register address 202/word 1, c. the System Trouble Interrupt word is located at register address 202/word 10, d. the Error Count Interrupt word is located at register address 202/word 11, e. the 16 word table (snapshot) used to store status and information at the time the Maintenance Controller RMN detects a fault is located at register address 203/words 0 to 15.

The address of the currently-scanned register is stored in the core memory RCM by the central control RCC for use by the data processor unit 130 when it accesses one of the called processing registers 0 to 201. In this regard, the data processor unit 130 must know the address of the call processing register currently being scanned so that the data processor unit 130 can determine whether or not the unit 130 can access a given pair of words from a register before it is accessed by the central control RCC. The relative scan position is transferred from the memory RCM to the data processor unit 130. The currently-scanned register identity is written into the appropriate dedicated RRJ scan word storage location in the first sub-time slot for each register. The data processor unit 130 can therefore read this word whenever it desires to know the address of the currently scanned register.

In regard to the Translation Interrupt, the register sender 200 notifies the data processor unit 130 that a call processing analysis is required by generating the hardware Translation Interrupt. The register sender initiates a Translation Interrupt whenever certain conditions specified by a previous translation from the data processor unit 130 are met. These conditions include the accumulation of dialed digits, occurrence of timeouts, and the recognition of certain 1 and 2 digit combinations. The register sender may also initiate a translation interrupt after executing an instruction from the data processor unit 130 as in the case of sender attachment for a sending operation.

The System Trouble Interrupt is an interrupt which permits the register sender 200 to notify the data processor unit 130 of a detected system error or fault. The system trouble interrupt is a hardware interrupt which is generated by the register sender 200. As hereinafter described in greater detail, the register sender 200 communicates the identity of the register detecting the trouble via the System Trouble Interrupt word. A system trouble condition results when information is transferred from one sub-system to another in a manner which is illogical.

When a system interrupt occurs, the System Trouble Interrupt word stored in the dedicated cores of the register address 202 at word 2 is transferred to the data processor unit 130. The system trouble interrupt word specifies the identity of the register causing the interrupt. Thus, the interrupt word is an address of one of the registers corresponding to one of the register junctors RRJ 0 to 191.

The Error Count Interrupt is an interrupt which is used whenever a momentary mismatch occurs between the duplicated pair of common logic units of the register sender 200 running in synchronism. When the error occurs, the maintenance controller RMN initiates a recycle of the register sender for the words of the core memory RCM associated with the mismatch. If the recycle is successful, the register sender classifies the condition as an error and notifies the data processor unit 130 via the Error Count Interrupt. As with the other interrupts, the register identity and the identity of the word store in which the error was detected is transferred to the data processor unit 130.

(3) Register Sender Timing

Figure 4:
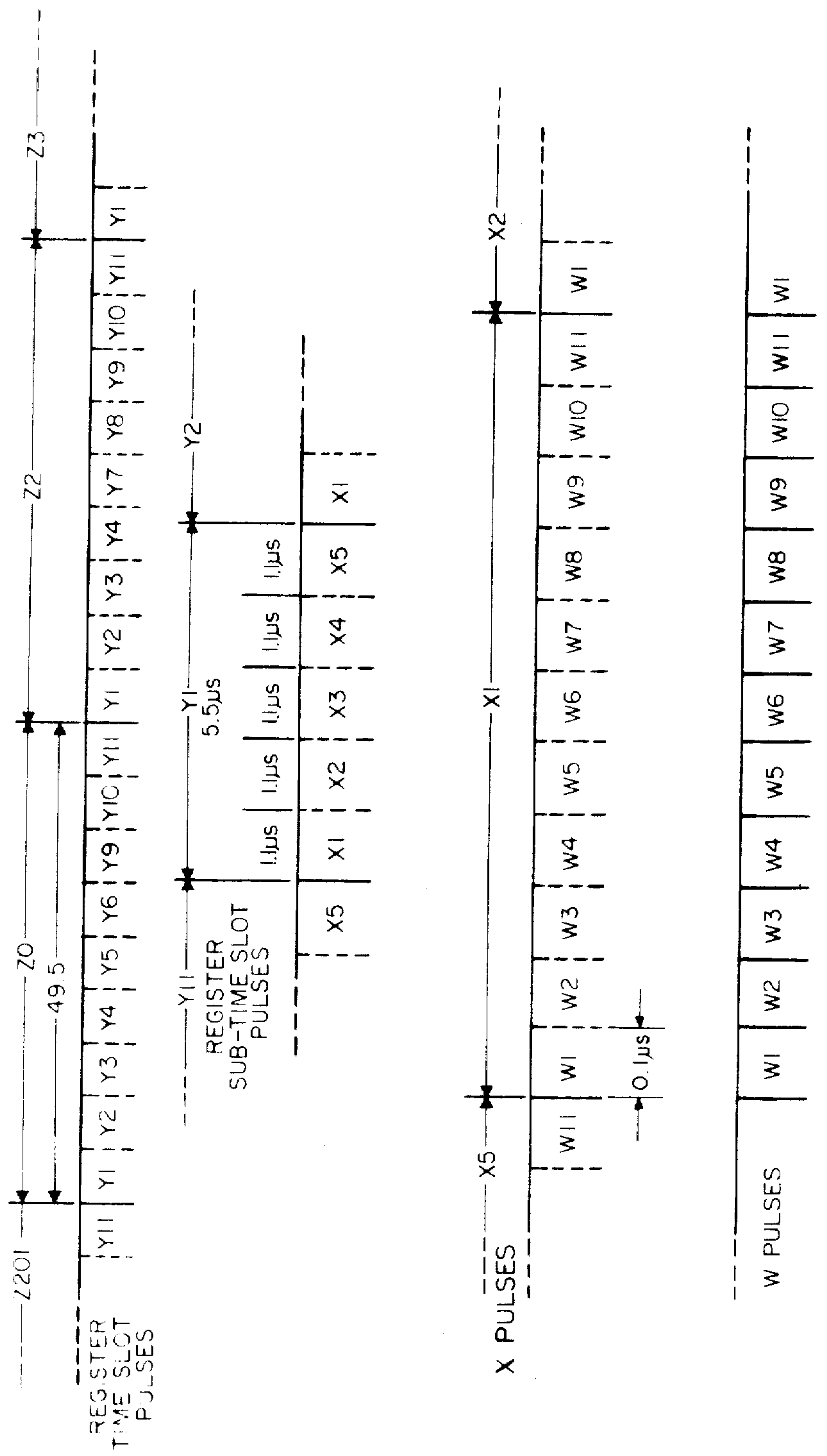
FIG. 4 is a timing diagram for the memory of the register sender.

Referring now to FIG. 4, the timing generator RTG (FIG. 2) of the register sender 200 provides the timing pulses which control the operation of the register 200 and which are shown in FIG. 4 of the drawings. The pulse generators of the timing generator RTG are used for the purpose of addressing the core memory RCM and for providing timing pulses for the various different logical operations of the register sender 200.

As shown in FIG. 4, the timing generator RTG generates recurring register time slot pulses Z*0* to Z201 which correspond to the respective 202 registers. Each one of the register time slot pulses has a duration of 49.5 $\mu$seconds for causing the write transfer RWT of the control RCC to access the register storage elements in the core memory RCM. Therefore, since there are 202 time slots and each time slot has a duration of 49.5 $\mu$seconds, the cycle time for accessing the 202 registers is approximately 10 milliseconds. The timing generator RTG also generates recurring register sub-time slot pulses Y1 to Y11 so that a combination of a Z time slot pulse and a Y sub-time slot pulse forms part of an address for a memory location in the memory. There are eight memory locations per register in the memory RCM, and different memory locations of a register can be accessed during the course of the establishment of a connection between the calling and called lines. As shown in FIG. 4, each sub-time slot pulse is 5.5 $\mu$seconds so that the duration of each Z time slot pulse is equal to the duration of nine sub-time slot pulses.

As shown in FIG. 4, recurring pulses X1 to X5 are also generated by the timing generator RTG, and each X pulse has a duration of 1.1 $\mu$seconds so that the duration of one sub-time slot pulse is equal to the duration of five X pulses. Moreover, recurring pulses W1 to W11 are generated by the timing generator RTG, each W pulse having a duration of 0.1 $\mu$seconds. Thus, as shown in FIG. 4, the duration of one X pulse is equal to the duration of 11 W pulses. In order to access a memory location during a register sub-time slot, the X and W pulses are utilized for timing the reading and writing of the two words in each memory location, which has an address identified by the Z and Y pulses. There are 55 combinations of X and W timing pulses which can be utilized for accessing the memory during various different times of a single sub-time slot.

Since the timing generator RTG forms a part of the common logic control of the register sender 200, the generator RTG is duplicated for reliability purposes. Thus, as shown in FIG. 2, each register sender 200 includes timing generator RTG–A and timing generator RTG–B. Since most timing and addressing pulses are derived from the timing generator, the duplicated timing generators RTG–A and RTG–B are operated in synchronism.

In each timing generator, there is a W pulse generator (not shown) which is an 11-stage ring counter. This counter advances one count for each clock pulse from a system clock (not shown). The X pulses are produced by an X pulse generator (not shown) in each one of the duplicated timing generators, each X pulse generator being a five-stage ring counter which advances after each cycle of the W pulse generator. A Y pulse generator (not shown) is provided in each one of the time generators and is advanced after each cycle of the X pulse generator. The Y pulse generator is a four-stage binary counter and the least significant bit stage from circuit RPI serves to alternately select the two words stored in each one of the memory locations of a register. As mentioned before, each memory location of a register comprises two separate word stores, and each word store comprises a set of 26 storage elements in the memory RCM.

A Z pulse generator (not shown) for producing the Z time slot pulses includes a binary counter which recycles after pulse Z201 is generated. The maintenance control RMN can recycle the Z counter for the purpose of synchronizing the duplicated timing generators RTG-A and RTG-B.

(4) Memory Access

Figure 5:
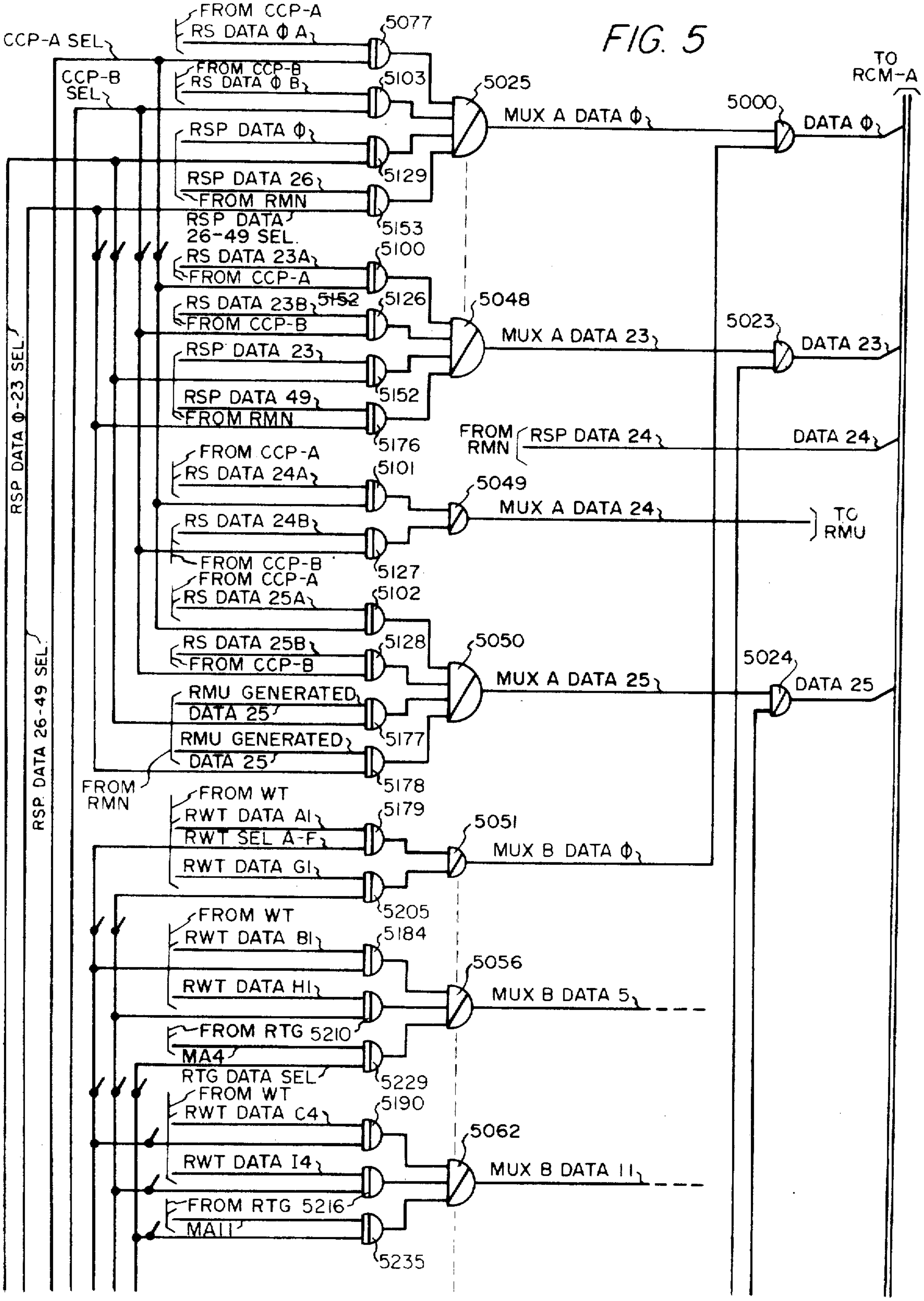
FIGS. 5-11 when arranged as shown in FIG. 14 comprise a symbolic block diagram of the memory access circuit and the priority and interrupt control circuit of the register sender of FIG. 2.
Figure 6:
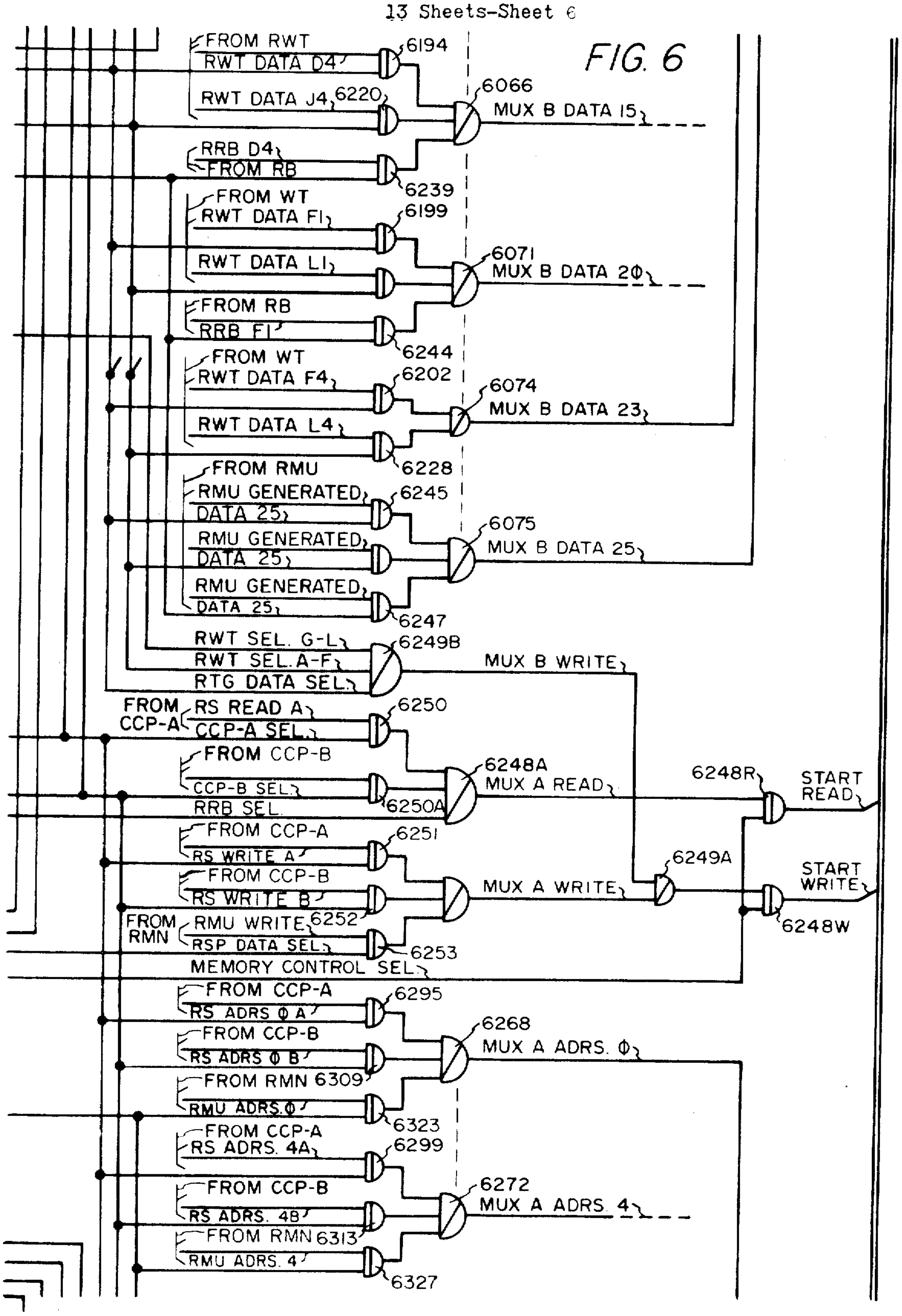
Figure 7:
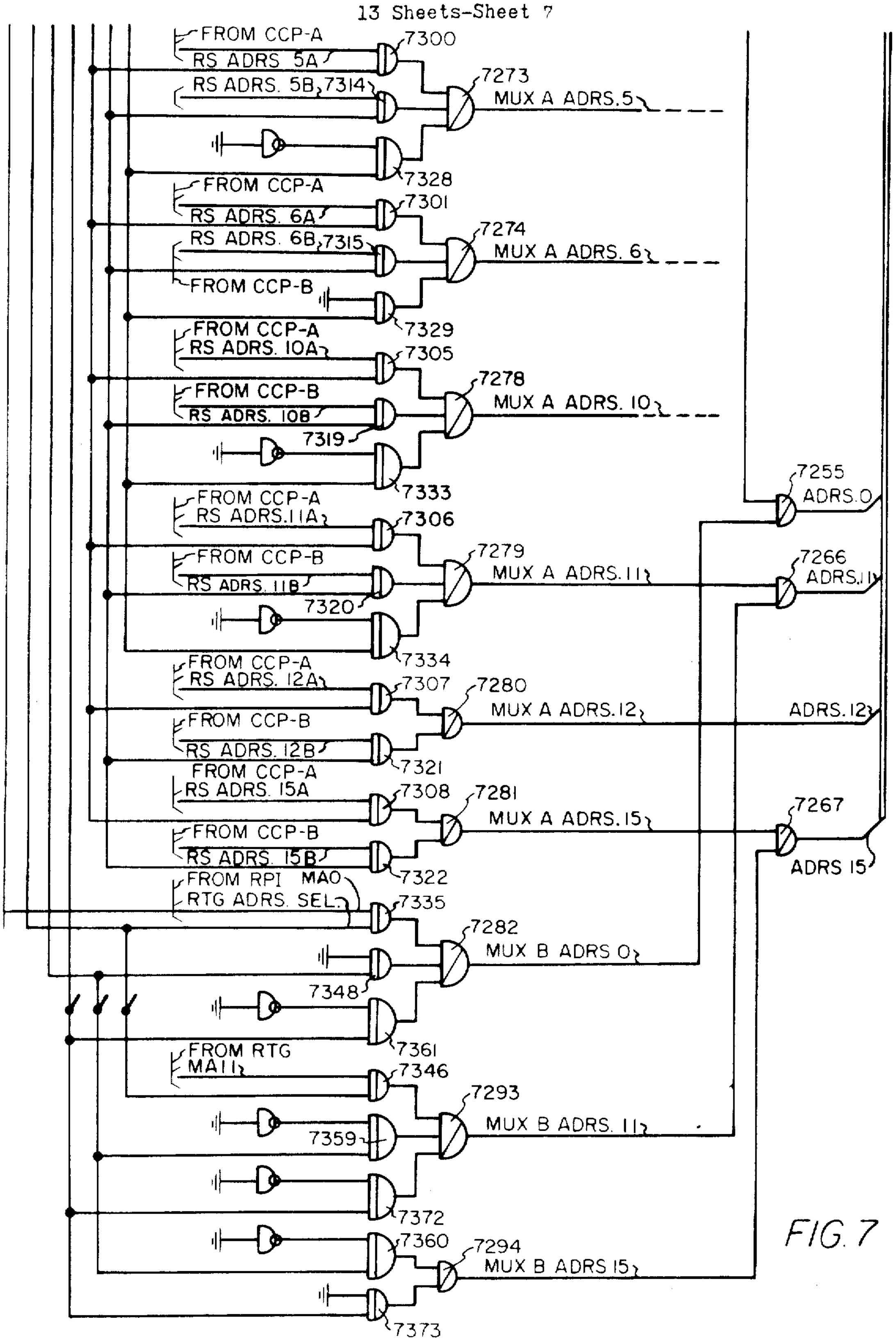

The memory access RMA is illustrated in detail in FIGS. 5, 6 and 7 when arranged vertically adjacent one another as shown in FIG. 14. The memory access RMA permits the memory RCM to be accessed. In this regard, the data processor unit 130, the write transfer RWT of the central control RCC, and the maintenance controller RMN access the core memory RCM via the memory access RMA. The memory access RMA feeds data, address, and memory and read and write control signal information from the above-mentioned three sources to the core memory RCM.

The memory access RMA sequentially receives two 26 bit words from the write transfer RWT of the central control RCC for gating into a memory location of a register in the core memory RCM. Also, the memory access RMA receives 12 address bits and two memory control signals for accessing the core memory RCM. The core memory RCM stores the two words in the appropriate memory location in response to the address bits MA1-MA11 which corresponds to a Z time slot pulse and a Y sub-time slot pulse, the appropriate word store of the memory location being addressed in response to the least significant bit stage MA*θ* for the priority and interrupt circuit RPI as mentioned in the foregoing discussion of the register sender timing arrangement.

The memory access RMA receives a 26 bit word on a random access basis from the CCP-A and the CCP-B of the data processor unit 130. The memory access RMA also receives 14 address bits and two memory read and write control signals from the CCP-A and CCP-B for addressing the memory. In like manner, the maintenance controller RMN also transfers a 24 bit data word for writing into the memory RCM, together with 12 address bits and a memory write control signal. The timing generator RTG sends 8 bits for the currently scanned register address information to be stored in the appropriate dedicated cores in the memory RCM, and the memory access RMA generates a hardware wired address for the appropriate dedicated core address in the memory RCM.

In regard to maintenance of the memory access RMA, any fault caused by the memory access RMA is detected by the maintenance controller RMN which makes a comparison of the outputs from the duplicated pair of memory access units RMA-A and RMA-B. A faulty memory access causes only the common logic control of the register sender associated with the faulty memory access RMA to be disabled and not the common logic control associated with the functioning memory access RMA. A fault in one memory access RMA does not prevent either computer processor CCP from working with a functioning memory access RMA since each memory access has inputs from both CCP-A and CCP-B.

As shown in FIGS. 5, 6 and 7 of the drawings, the memory access RMA-A, which is considered in detail and which is identical to memory access RMA-B, sends 26 data output signals DATA *θ* to DATA 25 for writing 26 bits of information into the core memory RCM-A via the cable 205. At this point, it should be understood that the symbol *θ* represents the numeral 0 as contrasted to and to be distinguished from the letter 0, and henceforth the signal designation will follow this convention wherever possible. A series of OR gates 5000 to 5024 generate the signals DATA *θ* DATA 23, and DATA 25, respectively. A series of 26 OR gates 5025 to 5050 generate respective signals MUX A DATA *θ* to MUX A DATA 25 which are directly coupled to the output OR gates 5000 to 5024. For all data sources, DATA 24 is generated by the RSP circuit for parity. A second group of 25 OR gates, such as OR gate 5051, generates signals MUX B DATA *θ* to MUX B DATA 23, and MUX B DATA 25, which are directly connected to the respective OR gates 5000 to 5024.

The signals DATA *θ* to DATA 25 are generated in response to either the MUX A DATA signals or the MUX B DATA signals to write 26 bits of information into the 26 columns of core storage elements in the memory RCM-A. In regard to the MUX A DATA signals, the information originating from the data processor unit 130 and the maintenance controller RMN are utilized to generate the MUX A DATA bits and thus to generate the DATA *θ* to DATA 23 and DATA 25 bits. The information originating from the write transfer RWT-A of the central control RCC-A, the address of the currently scanned register from the timing generator RTG-A, and the address of the register requesting a translation generate the signals MUX B DATA *θ* to MUX B DATA 23, and MUX B DATA 25.

A series of 26 AND gates 5077 to 5102 have outputs which are directly connected to the MUX A DATA OR gates 5025 to 5050 respectively, and data signals RS DATA *θ* A to RS DATA 25 A from the computer processor CCP-A of the data processor unit 130 are connected to one of the inputs to the AND gates 5077 to 5102 respectively. Each one of the AND gates 5077 to 5102 includes a second input which is connected in common to a select signal CCP-A SEL conductor from the priority and interrupt control RPI-A in a manner hereinafter described in greater detail. In like manner, data signals RS DATA *θ*B to RS DATA 25B from the computer processor CCP-B of the data processor unit 130 are supplied to certain ones of the inputs of a series of AND gates 5103 to 5128, respectively, the outputs of which are directly connected to the OR gates 5025 to 5050 and the other ones of the inputs to the AND gates 5103 to 5128 are connected in multiple to a select signal conductor CCP-B SEL from the priority and interrupt control RPI-A as hereinafter described in greater detail. Also in like manner, a series of 24 AND gates 5129 to 5152 and a series of 24 AND gates 5153 to 5176 transfer two 24-bit words to the memory RCM-A. In this regard, data signals RSP DATA *θ* to RSP DATA 23 are supplied to certain ones of the inputs to the AND gates 5129 to 5152, respectively, and data signals RSP DATA 26 to RSP DATA 49 are supplied to certain ones of the inputs of AND gates 5153 to 5176, respectively. The other ones of the inputs to AND gates 5129 to 5152 are connected in multiple to a select signal conductor RSP DATA θ–23 SEL from the priority and interrupt control RPI–A, and the other input to the AND gates 5123 to 5176 is connected in multiple to a select signal conductor RSP DATA 26–49 SEL which conveys its signal from the priority and interrupt control RPI–A. A pair of AND gates 5177 and 5178 have outputs which are directly connected to the AND gate 5050 for the signal MUX A DATA 25, and each one has an input designated as RMU GENERATED DATA 25 from the maintenance controller RMN. The other ones of the inputs to the AND gates 5177 and 5178 are respectively connected to the select signal conductors RSP DATA θ–23 SEL and RSP DATA 26–49 SEL.

A series of 25 AND gates, such as AND gate 5179, have outputs which are connected to inputs of the OR gates, such as the OR gate 5051, for generating the MUX B DATA signals, and one input of each of the AND gates, such as the AND gate 5179, is connected to one of the data signal conductors RWT DATA A1 to RWT DATA F4 from the write transfer RWT–A. The other input to the AND gates, such as the AND gate 5179 is connected in multiple to a select signal conductor RWT SEL A–F, which conveys its select signal from the priority and interrupt control RPI–A. In like manner, a series of 25 AND gates, such as AND gate 5205, have outputs which are connected to the OR gates for the MUX B DATA signals and which have one input which is connected to one of the 24 data bits RWT DATA G1 to RWT DATA L4 from the write transfer RWT–A. The other inputs to the second set of AND gates are energized by a common select signal RWT SEL G–L from the priority and interrupt control RPI–A. As shown in the drawings, the two 24-bit data words transferred from the write transfer RWT–A are subdivided into 12 4-bit digits, six of the four-bit digits being allocated to each of the two words. The first digit comprises data bits RWT DATA A1 to A4.

A series of eight AND gates 5229 to 5235 have outputs which are respectively connected to the inputs of the OR gates 5056 to 5062 for the MUX B DATA 5 to MUX B DATA 11 signals for transferring the address of the currently scanned register which comprises bits MA4 to 11 from the Z generator of the timing generator RTG–A. Thus, one of the inputs of each one of the AND gates 5229 to 5235 is connected to the respective ones of the signals MA4 to MA11, and the other ones of the inputs to the AND gates 5229 to 5235 are connected in multiple to a select signal conductor RTG DATA SEL from the priority and interrupt control RPI–A. A series of six AND gates 6239 to 6244 have outputs which are directly connected to the respective ones of the inputs of the OR gates 6066 to 6071 and have one of their inputs connected to the respective data signals RRB D4 to RRB F1 from the read buffer RB–A. The other ones of their inputs are connected in multiple to a select signal conductor REQ FOR TR WORD ADRS SEL which is generated by the priority and interrupt control RPI–A. These latter bits of information which are transferred from the read buffer RRB–A contain data relating to the type of translation required. A series of three AND gates 6240, 6241 and 6242 have outputs which are connected to the respective inputs to the OR gate 6075 for the signal MUX B DATA 25 and have one input connected to a signal conductor RMU GENERATED DATA 25 from the maintenance controller RMN, the other inputs being connected to the respective select signal conductors RWT SEL A–F, RWT SEL G–L, and REQ FOR TR WORD ADRS SEL.

In order to access the memory RCM–A, a pair of AND gates 6248R and 6248W generate respective signals START READ and START WRITE. The START READ signal is generated to read information from a memory location of the register in the core memory RCM–A. An OR gate 6248A generates a signal MUX A READ which in turn is supplied to one input of the AND gate 6248R. The other input to the AND gate 6248R is connected to a conductor MEMORY CONTROL SEL which originates from the priority and interrupt control RPI–A as hereinafter described in greater detail. A pair of AND gates 6250 and 6250A have outputs which are directly connected to two of the inputs to the OR gate 6248A, and a signal RRB SEL is supplied to the third input to the OR gate 6248A. A signal RS READ A from the computer processor CCP–A is coupled to one of the inputs to the AND gates 6250 to energize the OR gate 6248A when a signal CCP–A SEL is supplied to the other input to the AND gate 6250 so that when the signal MEMORY CONTROL SEL occurs, the AND gate 6248R generates the signal START READ. In the same manner, a signal RS READ B is supplied to one of the inputs to the AND gate 6250A which has its output connected to one of the inputs of the OR gate 6248A.

An OR gate 6249 has its output connected to one of the inputs to the AND gate 6248W for generating the START WRITE signal, and the other input to the AND gate 6248W is supplied with the signal MEMORY CONTROL SEL. A pair of OR gates 6249A and 6249B have their outputs connected to the two inputs to the OR gate 6249 for generating the respective signals MUX A WRITE and MUX B WRITE. A series of AND gates 6251 to 6253 have their outputs connected to the three inputs to the OR gate 6249A for generating the signal MUX A WRITE. The AND gate 6251 is energized by a signal RS WRITE A from the computer processor CCP–A when the other input to the AND gate 6251 is energized by the select signal CCP–A SEL to energize the OR gate 6249A so that the START WRITE signal can be generated when the signal MEMORY CONTROL SEL is generated. In like manner, in order for the computer processor CCP–B to generate the START WRITE signal, one of the inputs to the AND gate 6252 is supplied with a signal RS WRITE B from the computer processor CCP–B, and the other input to the AND gate 6252 is supplied with the select signal CCP–B SEL from the priority and interrupt control RPI–A. A signal RMU WRITE from the register controller RMN is supplied to one of the inputs to the AND gate 6253 to cause the AND gate 6253 to energize the OR gate 6249 when the select signal RSP DATA SEL, which is supplied to the other input to the AND gate 6253, becomes true as hereinafter described in greater detail.

The three inputs of the OR gate 6249B are supplied with the respective three select signals RWT SEL A–F, RWT SEL G–L, and RTG DATA SEL from the priority and interrupt control RPI–A for generating the START WRITE signal for writing two information words from the write transfer RWT–A into the memory locations in the memory RCM–A and for writing into the dedicated cores of the memory RCM–A.

In order to address the memory RCM–A, a series of 13 OR gates 7255 to 7267 and a conductor ADRS 12 generate address signals ADRS θ to ADRS 12, and ADRS 15, respectively. The address signals are transferred to the memory RCM–A whenever a READ or WRITE operation occurs to identify the group of cores of the memory RCM–A to be accessed. In this regard, the address signals identify the register to be accessed, or the dedicated core storage area to be accessed.

A series of 14 OR gates, such as OR gate 6268, generate signals MUX A ADRS θ to 12, and 15 which are supplied to the respective ones of the inputs to the OR gates 7255 to 7267, and a series of 13 OR gates 7282 to 7294 generate signals MUX B ADRS θ to 11, and 15 which are supplied to the corresponding other ones of the respective inputs to the OR gates 7255 to 7267. Thus, the MUX A ADRS signals and the MUX B ADRS signals selectively energize the OR gates 7255 to 7267. A series of 14 AND gates, such as AND gate 6295 have outputs which are connected to corresponding ones of the inputs of the OR gates generating the MUX A ADRS signals and have one of their inputs energized by the respective signals RS ADRS θ A to 12A, and 15A from the computer processor CCP–A to supply an address from the computer processor CCP–A. The other input to the series of AND gates are connected in multiple to the select signal conductor CCP–A SEL.

In order to permit the computer processor CCP–B to transmit an address to the memory RCM–A, a series of 14 AND gates, such as AND gate 6309, are connected to corresponding other ones of the inputs to the OR gates, such as the OR gate 6268, generating the MUX A ADRS signals. The signals RS ADRS θ B to 12 B, and 15 B are supplied to corresponding ones of the inputs to the last-mentioned AND gates from the computer processor CCP–B, the other ones of the inputs to the AND gates, such as the AND gate 6309, being connected in multiple to the select signal lead generating the signal CCP–B SEL. The bit RS ADRS 12 B designates which one of the duplicated pair of register senders is to receive the information, and bit RS ADRS 15 B is a parity bit.

For the purpose of permitting the maintenance controller RMN to transfer an address of the dedicated cores for the maintenance controller to the memory RCM–A, there is provided a series of five AND gates 6323 to 6327 which have their outputs connected to corresponding ones of the inputs of the OR gates 6268 to 6272 generating the MUX A ADRS θ to 4. A series of eight AND gates 7328 to 7333 have their outputs connected to certain ones of the inputs of the respective OR gates 7273 to 7279 generating the MUX A ADRS 5 to 12 signals and have one of their inputs hardware wire to generate the address 203 which is one of the addresses of the dedicated cores in the memory RCM–A. The bits RMU ADRS θ to 4 generated by the AND gates 6323 to 6327 designate the word of the dedicated core storage area 203. The other ones of the inputs to the AND gates 6323 to 6327 and AND gates 7328 to 7334 are each connected in multiple to the select signal conductor RMU ADRS SEL from the priority and interrupt control RPI–A.

Figure 8:
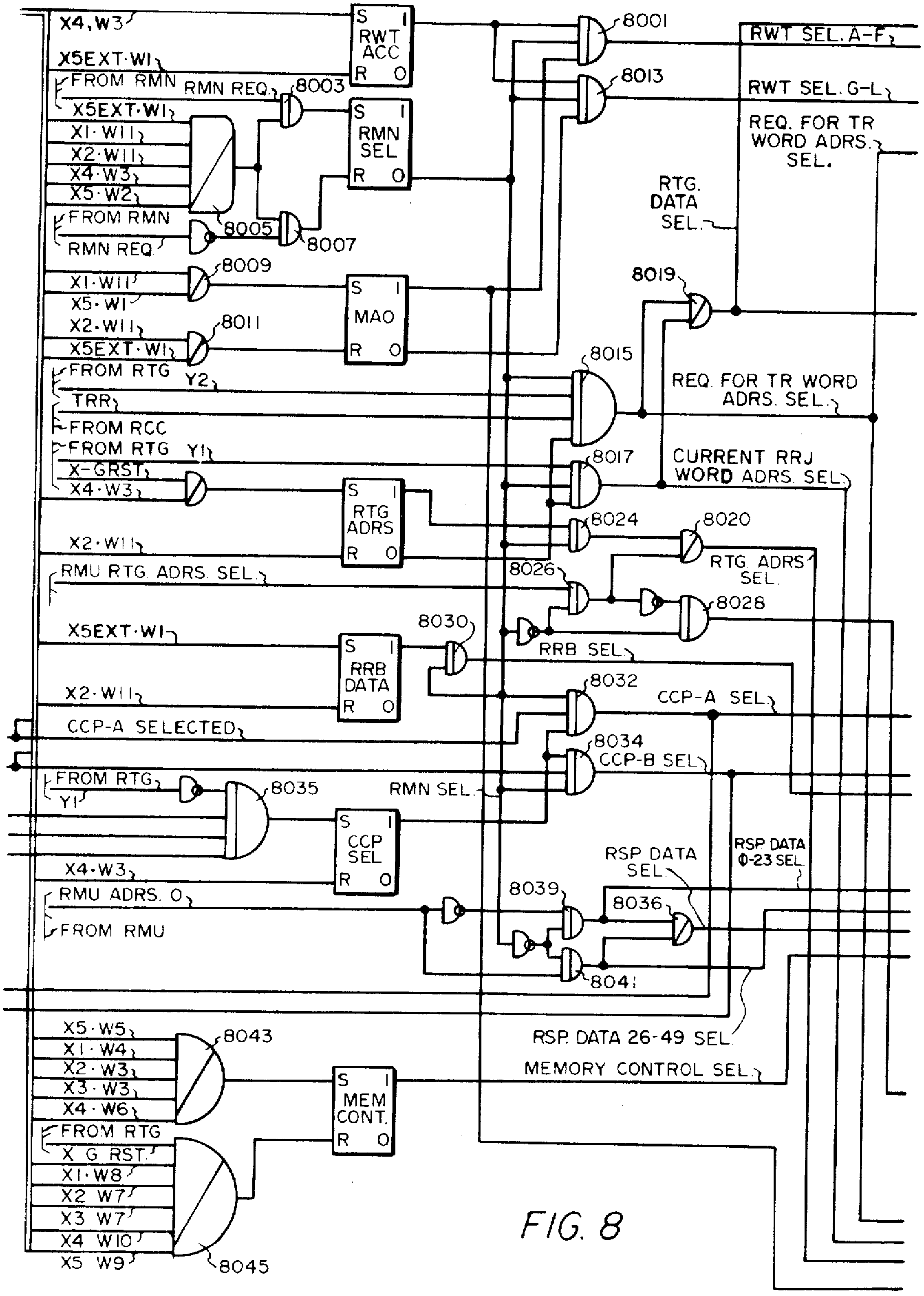

A series of 12 AND gates 7335 to 7346 have outputs connected to the respective ones of the inputs of the OR gates 7282 to 7293, and have certain ones of their inputs connected to corresponding ones of a series of conductors supplying signals MA θ from FIG. 8 and MA1 to 11 from the RTG–A Y and Z generators to designate the address of the currently scanned register. The other ones of the inputs to the AND gates 7335 to 7346 are connected in multiple to the select signal RTG ADRS SEL. A series of 12 AND gates 7348 to 7359 are used for generating the address of the dedicated cores for storing the address of the currently scanned register. In this regard, the AND gates 7348 to 7359 have outputs connected to corresponding ones of the inputs to the OR gates 7282 to 7293, and certain ones of their inputs are hardware wired to form the address of the dedicated cores. The other ones of the inputs to the AND gates 7348 to 7359 are connected in multiple to the select signal conductor CURRENT RRJ WORD ADRS SEL. An AND gate 7360 has an output connected to an input of the OR gate 7294 to generate a hardware wired parity bit for the hardware wired address of the dedicated core storage area storing the address of the currently scanned register. In this regard, certain ones of the inputs to the AND gate 7360 are hardware wired inputs, and the other ones of the inputs are supplied with the select signal CURRENT RRJ WORD ADRS SEL.

In regard to the request for translation information, there is provided 12 AND gates 7361 to 7372 which have outputs that are connected to the respective ones of the inputs of the OR gates 7282 to 7293 and which have hardware wired inputs designating the address of the dedicated core storage area for storing the address of the register requesting a translation. Thus, certain ones of the inputs to the AND gates 7361 to 7372 are hardware wired, and the other ones of the inputs to the AND gates 7361 to 7372 are connected in common to the select signal conductor REQ FOR TR WORD ADRS SEL. Also, there is provided an AND gate 7373 which has an output connected to one of the inputs of the OR gate 7294 generating the signal MUX B ADRS 15 for generating a hardware parity bit for the dedicated core address associated with the AND gates 7361 to 7372. Thus, one of the inputs to the AND gate 7373 is hardware wired, and its other input is supplied with the signal REQ FOR TR WORD ADRS SEL.

(5) Priority Control

Figure 9:
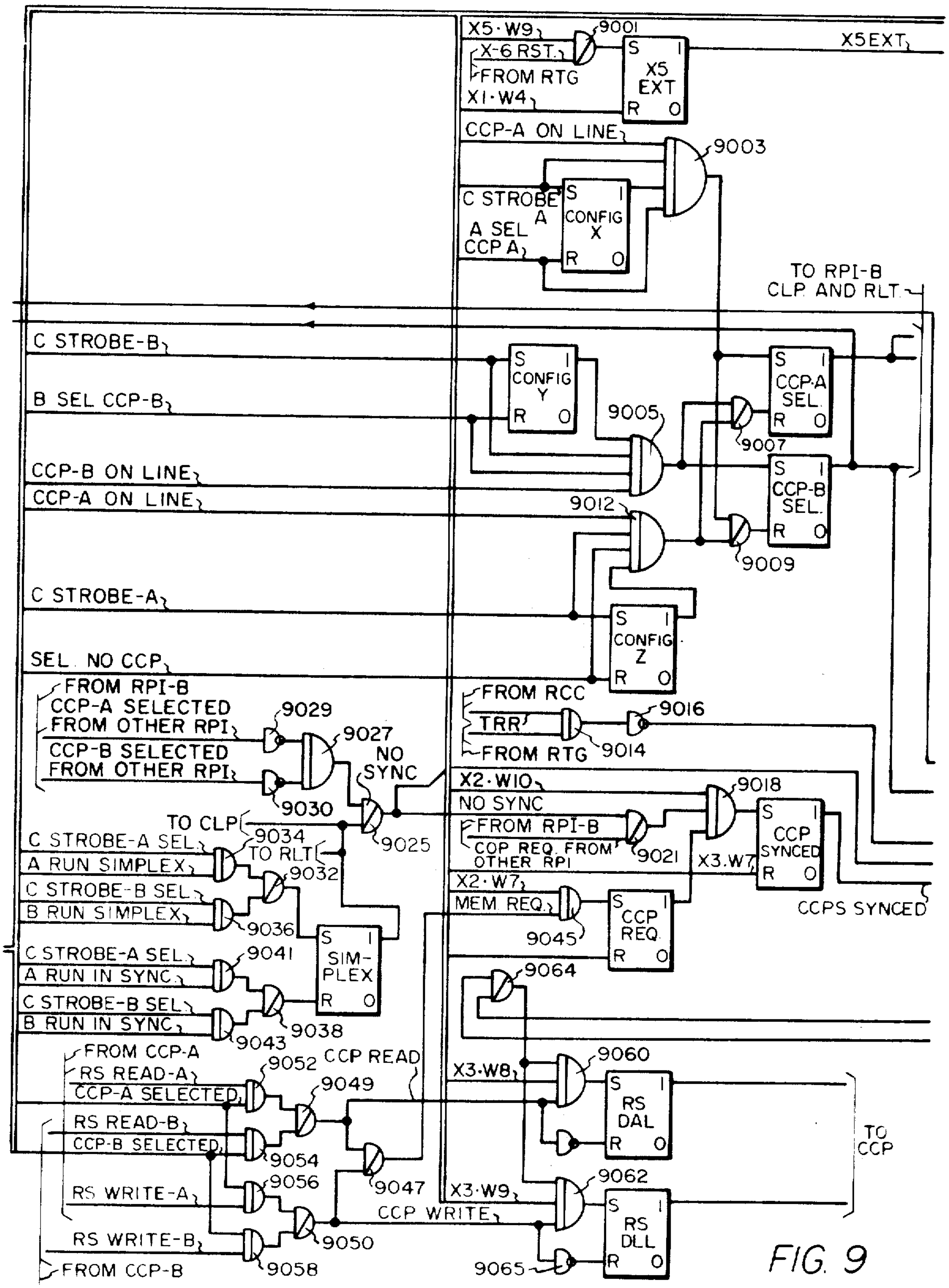
Figure 10:
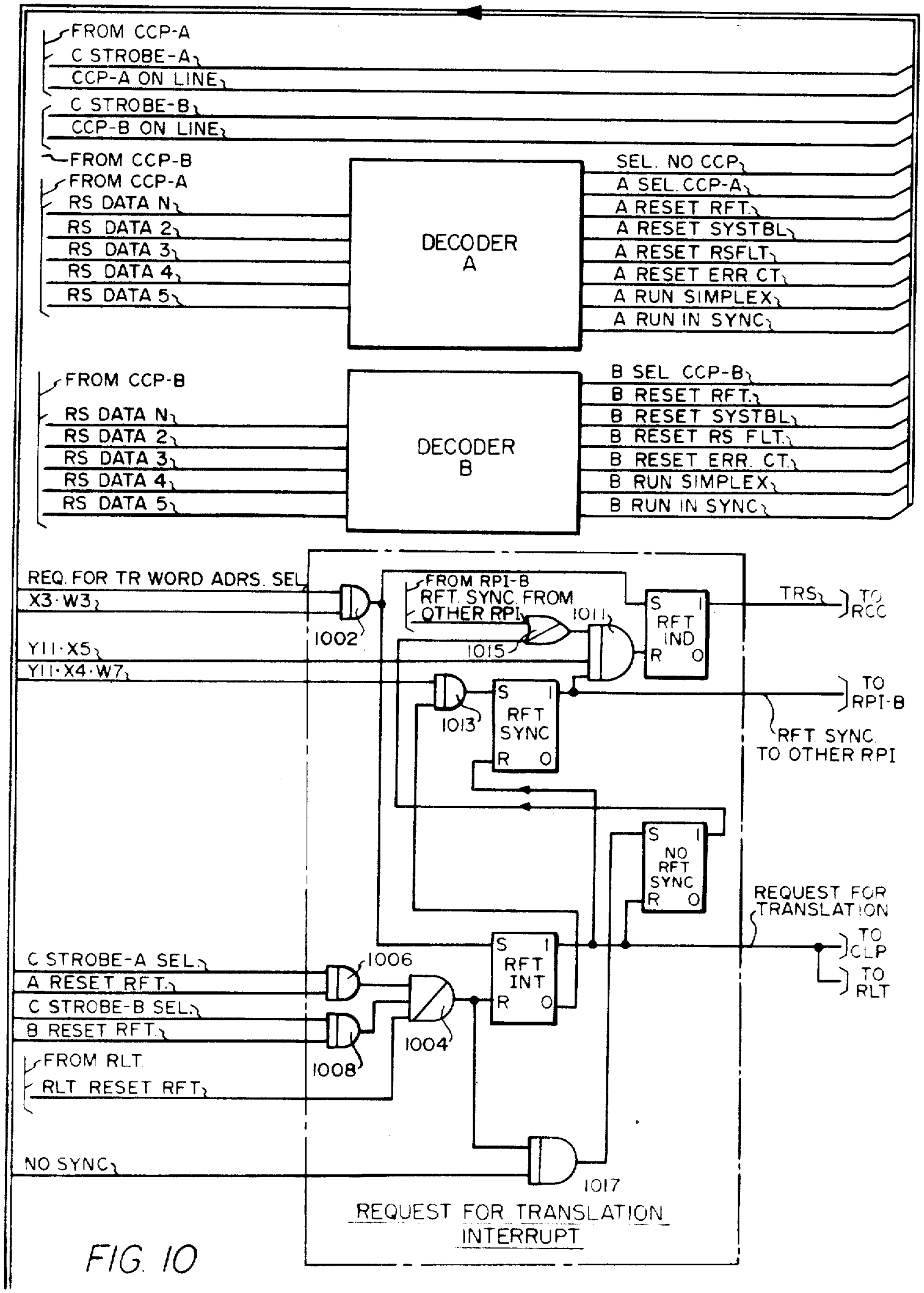

Referring now to FIGS. 8 to 10 when arranged as shown in FIG. 14, there is shown the priority and interrupt control RPI–A which as mentioned before is identical to the priority and interrupt control RPI–B and which controls the memory access RMA–A. The priority portion of the priority and interrupt control RPI–A generates the select signals for the memory access RMA–A in accordance with a predetermined priority. Thus, the select signals generated by the priority and interrupt control RPI–A determine which source accesses the memory RCM–A and when the access will occur.

Referring now in particular to FIG. 8, the select signals will now be described in greater detail. An AND gate 8001 generates the select signal RWT SEL A–F in response to the outputs of a latch RWT ACC, a latch RMN SEL, and a latch MA θ. Thus, the signal RWT SEL A–F = RWT ACC · RMN SEL · MA θ. The RWT ACC latch is the write transfer access latch which is set at the coincidence of X4 and W3. It should be noted at this point that while the conductor connected to the set input to the RWT ACC latch is designated as X4·W3, it is to be understood that this signal is generated by an AND gate (not shown) in the priority and interrupt control RPI–A. This convention for the timing signals and the priority and interrupt control RPI–A will be followed wherever possible. Thus, the latch RWT ACC is set at the beginning of the fourth access time which is the time when the first or so-called "right-hand" word is written into the memory location, and it is reset during X5 EXT·W1 which is the beginning of the first access time A1. As shown in FIG. 9, a latch X5 EXT is set in response to the output of an OR gate 9001 which in turn is energized during X5·W9 or by a signal X–G RST from the timing generator RTG–A. The X5 EXT latch is reset during X1·W4. The sole purpose for generating the timing signal X5 EXT is to ensure that a latch is set upon the occurrence of the timing signal W1. Thus, the signal X5 EXT is gated with the timing signal W1 instead of gating the timing signal X1 with the timing signal W1, since the beginning of the timing signal X1 may not occur prior to or simultaneously with the occurrence of the beginning of the timing signal W1.

The latch RMN SEL is set in response to the output of an AND gate 8003 which responds to a signal RMN REQ from the maintenance controller RMN for requesting the maintenance controller and to the output of an OR gate 8005, which responds to either one of five different timing signals. In this regard, a timing signal X5 EXT·W1, as mentioned before, represents the beginning of the first access time, signal X1·W11 represents the end of the first access time and the beginning of the second access time, signal X2·W11 represents the end of the second access time, the signal X4·W3 represents the end of the third access time and the beginning of the fourth access time, and the remaining signal X5·W2 represents the beginning of the fifth access time. In order to reset the RMN SEL latch, an AND gate 8007 has its output connected to the reset input to the AND gate RMN SEL and has its two inputs connected respectively to the output of the OR gate 8005 and to the output of an inverter 8008 which has its input connected to a RMN REQ conductor from the maintenance controller RMN. Thus, if the maintenance controller is not requested during the five access times associated with the OR gate 8005, the RMN SEL latch is reset.

In order to set the MA θ latch, an OR gate 8009 has its output connected to the set input of the MA θ latch and has a pair of inputs which respond to a signal X1·W11 and a signal X5·W1. An OR gate 8011 has its output connected to the reset input of the MA θ latch and responds either to the signal X2·W11 or the signal X5 EXT·W1. Thus, the MA θ latch is used for the purpose of designating either the left or right word of the memory storage location. The MA θ latch is used to control which one of the select signals RWT SEL A–F, or RWT SEL G–L is to be generated. The MA θ latch alternates between the left and right-hand words for both reading and writing. At the beginning of the first access period during which one of the words is read from a memory location, the MA θ latch is reset and is then set at the beginning of the second access period during which the other word is read from the same memory location. The latch is reset at the end of the second access period and remains reset until the end of the fourth access period. During the third or middle access period, the data processor unit 130 or the maintenance controller RMN can access the memory on a random access basis. During the fourth access period, the signal RWT SEL A–F is generated for writing the right word into the memory. At the end of the fourth access period, the latch is set to cause the select signal RWT SEL G–L to be generated for writing the left word into the memory location.

For the purpose of generating the select signal REQ FOR TR WORD ADRS SEL, there is provided an AND gate 8015 having its inputs connected to the zero output of the RMN SEL latch, a Y2 conductor from the timing generator RTG–A, a TRR conductor from the central control RCC–A, and a zero output of a RTG ADRS latch which is set once each cycle for the purpose of generating the select signal RTG ADRS SEL signal for gating the address of the dedicated cores storing the address of the currently scanned register. The signal TRR is a request for translation signal from the central control RCC. An AND gate 8017 generates the select signal CURRENT RRJ WORD ADRS SEL and has its inputs connected to a conductor designated Y1, the zero output of the RMN SEL latch, and the zero output of the RTG ADRS latch. An OR gate 8019 generates the select signal RTG DATA SEL and has its inputs connected directly to the outputs of the AND gates 8015 and 8017.

An OR gate 8020 generates the select signal RTG ADRS SEL and has its inputs connected directly to the outputs of a pair of AND gates 8024 and 8026. The AND gate 8024 has a pair of inputs connected respectively to the one output of the RTG ADRS latch and to the zero output of the RMN SEL latch so that the select signal RTG ADRS SEL is generated when the RTG ADRS latch is set and the RMN SEL latch is reset. The RTG ADRS latch is set in response to either the signal X–G RST from the timing generator RTG–A or in response to the timing signal X4·W3 which occurs each sub-time slot. The RTG ADRS latch is reset during the following sub-time slot when X2·W11 occurs. The AND gate 8026 has its output connected to the other input of the OR gage 8020 and energizes it is response to a signal RMU RTG ADRS SEL from the maintenance controller RMN for maintenance purposes and when the RMN SEL latch is set. An AND gate 8028 generates the select signal RMU ADRS SEL in response to the setting of the RMN SEL latch and the output of AND gate 8026 being false.

An AND gate 8030 generates the select signal RRB SEL and has one of its inputs connected to the one output of a latch circuit RRB DATA, the other input being connected to the zero output of the RMN SEL latch. The latch RRB DATA is set by the signal X5 EXT·W1 and is reset at X2·W11. Thus, the RRB SEL signal is generated during the first two access periods.

A pair of AND gates 8032 and 8034 generate the select signals CCP–A SEL and CCP–B SEL. The AND gate 8032 has one of its inputs connected to the one output of a latch CCP–A SELECTED (FIG. 9), and the AND gate 8034 has one of its inputs connected to a latch CCP–B SELECTED (FIG. 9). The latch circuits CCP–A SELECTED and CCP–B SELECTED designate which one of the computer processors CCP–A or CCP–B is currently on line and communicating with the memory RCM–A. Other ones of the inputs to the AND gates 8032 and 8034 are connected together in multiple to the zero output of the RMN SEL latch to provide a priority of operation so that the maintenance controller RMN can access the memory RCM–A and in so doing inhibit the data processing unit 130 from accessing the memory RCM–A. The pair of AND gates 8032 and 8034 each have a third input which is connected together in multiple to the one output of a latch CCP-SEL which is set during X2·W11 when both computer processors CCP–A and CCP–B are operating in synchronism with the respective memories RCM–A and RCM–B.

An OR gate 8036 has an output which generates the select signal RSP DATA SEL and has a pair of inputs which are directly connected to the respective outputs of a pair of AND gates 8038 and 8041. The outputs of the AND gates 8038 and 8041 generate the respective select signals RSP DATA *θ* – 23 SEL and RSP DATA 26–49 SEL. The AND gates 8038 and 8041 are energized in response to the output of the latch RMN SEL and a signal RMU ADRS *θ* from the RMU portion of the maintenance controller RMN, the gate 8038 being energized when the signal RMU ADRS *θ* is false and the gate 8041 being energized when the signal RMU ADRS *θ* is true.

A latch MEM CONT generates the signal MEMORY CONTROL SEL for the AND gates 6243 and 6244 which generate the respective signals START READ and START WRITE. the latch MEM CONT is the memory control latch which is set and reset by the respective OR gate 8043 and 8045 at the various different timing intervals as shown in FIG. 8. Thus, the control signals START WRITE and START READ are generated for short intervals of time during each access period.

(6) Configuration

Referring now to FIG. 9, the pair of latches CCP–A SELECTED and CCP–B SELECTED designate which one of the computer processors CCP–A or CCP–B is currently on line and communicating with the core memory RCM–A, and have outputs which are used for generating the select signals CCP–A SEL and CCP–B SEL, as mentioned before, for use by the priority and interrupt control RPI–B, the computer line processor CLP, and a local test panel RLT (not shown) for test purposes. The pair of latches CCP–A SEL and CCP–B SEL are controlled by a set of three latches CONFIG X, CONFIG Y and CONFIG Z, which are the configuration latches for designating the configuration of the relationship between the core memory RCM–A, and the computer processors CCP–A and CCP–B of the data processor unit 130. In this regard, an AND gate 9003 has its output connected to the set input of the latch CCP–A SEL and is energized in response to the following signal: CONFIG X·CCP–A ON LINE·C STROBE-A·A SEL CCP–A. The latch CONFIG X is set by the signal C STROBE A (see FIG. 10), which is a start signal from the computer processor CCP–A of relatively short duration, and the latch CONFIG X is reset by the signal A SEL CCP–A which is generated by the decoder A (FIG. 10) which decodes information from the computer processor CCP–A. Thus, when the signal CCP–A ON LINE is generated and the signals C STROBE-A and A SEL CCP–A are generated in coincidence, the latch CONFIG X is set and the AND gate 9003 is energized to in turn set the latch CCP–A SEL. When the signal C STROBE-A is no longer true, the signal A SEL CCP–A resets the latch CONFIG X.

In like manner, an AND gate 9005 has its output connected to the set input of the latch CCP-B SELECTED and is energized in response to the following command; CONFIG Y·CCP–B ON LINE·C STROBE-B·B SEL CCP–B. The operation of setting the latch CCP–B SEL is similar to the operation of setting the latch CCP–A SEL. The signal C STROBE-B (see FIG. 10) is a start signal which is generated by the computer processor CCP–B and is of short duration. The signal B SEL CCP–B is generated by the decoder B (FIG. 10) in response to information received from the computer processor CCP-B. Also, the signal CCP–B ON LINE is generated by the computer processor CCP–B and indicates that the computer processor CCP–B is on line. In order to reset the latches CCP–A SEL and CCP–B SEL, the AND gates 9003 and 9005 have their outputs connected to the corresponding inputs of the respective OR gates 9007 and 9009 which have their respective outputs connected to the respective reset inputs to the latches CCP–A SEL and CCP–B SEL so that when one of the latches CCP–A SEL and CCP–B SEL is set, the other one is reset.

Normally, the computer processor CCP–A is on line with the priority and interrupt control RPI–A and the core memory RCM–A. However, when a reconfiguration occurs in order to place the RPI–A off line, both of the latches CCP–A SEL and CCP–B SEL are reset. In this regard, an AND gate 9012 has its output connected in multiple to certain ones of the inputs to the OR gates 9007 and 9009 for resetting the latches CCP–A SEL and CCP–B SEL. The AND gate 9012 is energized by the following command: CONFIG Z·CCP–A ON LINE·C STROBE-A·SEL NO CCP. Thus, the AND gate 9012 is energized in a similar manner as the manner in which the AND gates 9003 and 9005 are energized. The signal SEL NO CCP is generated by the decoder A (FIG. 10) and indicates that no computer processor CCP is currently selected.

The select signals CCP–A SEL and CCP–B SEL (FIG. 8) are generated in response to the command $\overline{\text{TRR}}$·Y2 which is generated by an AND gate 9014 having an inverter gate 9016 connected directly to its output, and the command X2·W11·CCPS SNYCED. The signal CCPS SYNCED is generated by a latch CCP SYNCED which is set in response to the output of an AND gate 9018 which has its input connected to an OR gate 9021, to the one output of a latch CCP REQ, and to the signal X2·W10 which occurs at the end of the second access period. The latch CCP SYNCED is reset at X3·W7. In this regard, the data processing unit 130 can access the memory RCM–A during the middle access time.

The OR gate 9021 responds to the signal NO SYNC or the signal CCP REQ FROM OTHER RPI, which is generated by the priority and interrupt control RPI–B. The signal NO SYNC indicates that the RS common logic units A and B are not operating in synchronism. In this regard, the computer processor CCP–A and the computer processor CCP–B communicate with only one core memory, RCM–A or RCM–B. In the duplex mode of operation, the signal CCP REQ FROM OTHER RPI is generated to energize the OR gate 9021. The signal NO SYNC is generated by an OR gate 9025 and which indicates that the RS common logics are not operating in synchronism. The OR gate 9025 responds to the output of an AND gate 9027 which is energized by the other priority and interrupt control RPI–B, or the one output of a latch SIMPLEX. The latch SIMPLEX, when set, designates a simplex mode of operation, and generates a signal RUN SIMPLEX SELECTED, which is transferred to the computer line processor CLP of the data processor unit 130 and to a local test panel RLT (not shown). The AND gate 9027 indicates that the other RPI is not generating the signals CCP–A SELECTED and CCP–B SELECTED. In this regard, a pair of signals CCP–A SELECTED FROM OTHER RPI and CCP–B SELECTED FROM OTHER RPI are supplied to a pair of inverter logic gates 9029 and 9030, respectively, which have their outputs connected to the inputs of the AND gate 9027. Thus, the AND gate 9027 is energized when RPI–B is selecting neither CCP–A nor CCP–B.

In the RS simplex mode of operation, the latch SIMPLEX is set in response to an OR gate 9032, which has its inputs connected respectively to the outputs of a pair of AND gates 9034 and 9036. The AND gate 9034 is energized in response to the command C STROBE-A SEL·A RUN SIMPLEX. the signal A RUN SIMPLEX is generated by the decoder A (FIG. 10) in response to information received from the computer processor CCP–A, and the signal C STROBE-A SEL is generated in response to the command C STROBE-A·CCP–A SELECTED as hereinafter described in greater detail with respect to FIG. 10. The AND gate 9036 responds to the command C STROBE-B SEL·B RUN SIMPLEX, which is similar to the command which energizes the AND gate 9034 and which is generated in response to the computer processor CCP–B. The latch SIMPLEX is reset in response to an output of an OR gate 9038, which has its inputs connected respectively to the outputs of a pair of AND gates 9041 and 9043. The AND gates 9041 and 9043 are energized when the register-sender common logic units operate in synchronism. More particularly, the AND gate 9041 is energized in response to the command C STROBE-A SEL·A RUN IN SYNC, signal A RUN IN SYNC being generated by the decoder A in response to information received from the computer processor CCP–A. The AND gate 9043 is energized in response to the command C STROBE-B SEL·B RUN IN SYNC, the signal B RUN IN SYNC being generated by the decoder B.

The latch CCP REQ designates a memory request and is set in response to an AND gate 9045 which is energized by the command MEM REQ·X2·W7. Thus, the latch CCP REQ is set prior to the setting of the latch CCP SYNCED which is set at X2·W10. The signal MEM REQ is the memory request signal which is generated by an OR gate 9047 when one of the computer processors CCP–A or CCP–B is requesting the access of the memory RCM–A by either requesting a READ or a WRITE operation. In this regard, a pair of OR gates 9049 and 9050 have their outputs connected respectively to the inputs to the OR gate 9047, and generate the respective signals CCP READ and CCP WRITE. A pair of AND gates 9052 and 9054 have their outputs connected to the respective inputs to the OR gates 9049. The AND gate 9052 is energized in response to the command RS READ-A·CCP–A SELECTED. The signal RS READ-A is generated by the computer processor CCP–A to request the reading of the memory RCM–A. Likewise, the AND gate 9054 is energized by the computer processor CCP–B by the command RS READ-B·CCP–B SELECTED. A pair of AND gates 9056 and 9058 energize the OR gate 9050 to generate the signal CCP WRITE. The AND gate 9056 responds to the command CCP–A SELECTED·RS WRITE-A. The signal RS WRITE-A is generated by the computer processor CCP–A to request the writing of information into the memory RCM–A. The AND gate 9058 responds to a command CCP–B SELECTED·RS WRITE-B from the computer processor CCP–B to request the writing of information by the computer processor CCP–B into the core memory.

For the purpose of informing the computer processors that the data is available for reading from the core memory or that the data was written into the core memory during a write operation, there is provided a pair of latches RS DAL and RS DLL which have their one outputs connected to the computer processors. The latch RS DAL is the data available latch which is set when the desired information was read from the memory RCM–A and is currently available for the computer processor. An AND gate 9060 has its output connected directly to the set input of the data available latch and responds to the command (CCP–A SEL + CCP–B SEL) X3·W8·CCP READ. Thus, when either one of the select signals CCP–A SEL or CCP–B SEL is generated to read information from the memory RCM–A, the data available latch is set at X3·W8 after the signal CCP READ is generated in response to either one of the signals RS READ-A or RS READ-B from the computer processors. As a result, a verification or "-handshake" is provided during a read operation. The data available latch is reset when the signal CCP READ becomes false after the computer processor receives a verification.

The latch RS DLL is the data loaded latch and is set in response to an AND gate 9062, which is similar to the ANd gate 9060 and which has one of its inputs connected to the output of an OR gate 9064 for generating the command CCP–A SEL + CCP–B SEL, the output of the OR gate 9064 also being connected directly to one of the inputs to the AND gate 9060. The AND gate 9062 has two other inputs which respond to the signal X3·W9 and the signal CCP WRITE. As a result, the data loaded latch is set when the select signals CCP–A SEL or CCP–B SEL are generated and when the signal CCP WRITE is generated by the computer processors at X3·W9, whereby after the computer processor requests a write operation and after the write operation is completed, the data loaded latch is set to inform the computer processor that the information was written into the memory RCM-A. Thus, a verification or "-handshake" is provided for the write operation. After the data loaded latch is set and the computer processor receives the data loaded verification, the computer processor turns off the signal RS WRITE to cause the signal CCP WRITE to become false, whereby an inverter gate 9065 resets the data loaded latch.

Each of the computer processors includes a timer which times the handshake operation for both the read and write operations. As a result, if the computer processor does not receive the handshake verification within a predetermined amount of time, the timer provides a fault indication so that the situation can be remedied by appropriate maintenance techniques.

(7 Interrupts

Figure 11:
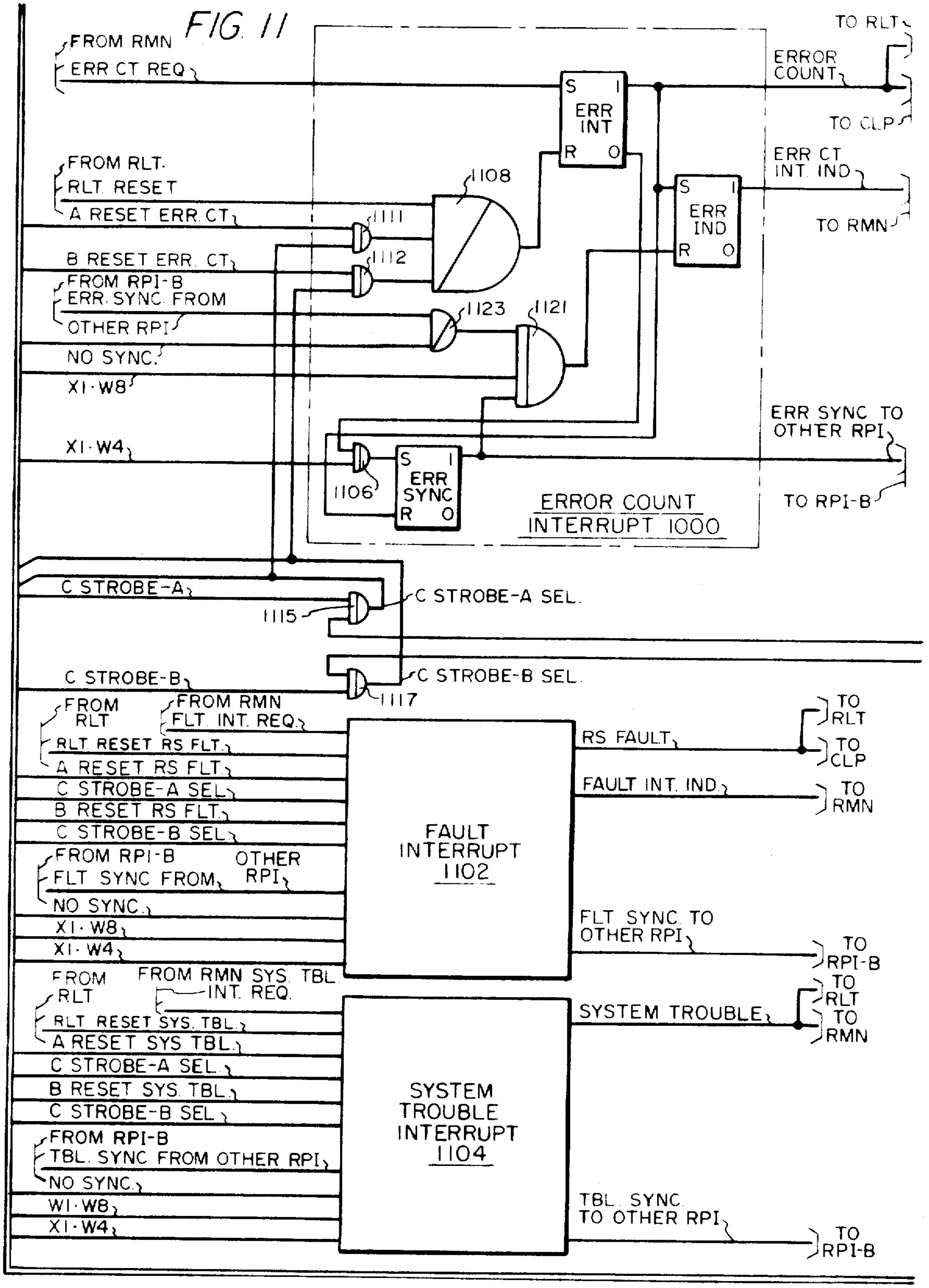

Referring now to FIGS. 10 and 11, there is shown the logic circuitry for the following interrupts: (1) request-for-translation interrupt, (2) error count interrupt, (3) fault interrupt, and (4) system trouble interrupt. Considering first the request-for-translation interrupt, a latch RFT INT is the request for translation interrupt latch and is set in response to an AND gate 1002 which is energized by the command REQ FOR TR WORD ADRS SEL·X3·W3. The signal REQ FOR TR WORD ADRS SEL IS generated, as mentioned before, by the AND gate 8015 (FIG. 8) in response to the signal TRR from the central control RCC-A. The output of the AND gate 1002 is also connected directly to the set input of a latch RFT IND, which is the request for translation indicator latch and which when set generates a signal TRS for the central control RCC-A to indicate that a request for translation is currently being requested of the data processor unit 130. An OR gate 1004 has its output directly connected to the reset input of the RFT INT latch to reset it when the data processor unit 130 responds to the request. In this regard, a pair of AND gates 1006 and 1008 have their outputs respectively connected to two of the inputs of the OR gate 1004, and AND gate 1006 being responsive to the command C STROBE-A SEL·A RESET RFT and the AND gate 18 being responsive to the command C STROBE-B SEL·B RESET RFT. The signals A RESET RFT and B RESET RFT are generated by the decoder A and decoder B, respectively. The OR gate 1004 also responds to a signal RLT RESET RFT from the local test panel (not shown) for resetting the latch RFT INT.

In order to reset the latch RFT IND, an ANd gate 1011 has its output connected to the reset input of the latch RFT IND to reset it near the end of a sub-time slot for a register. In this regard, the AND gate 111 responds to a signal Y11·X5, the output of an OR gate 1015 output of a latch RFT SYNC which in turn is set by an AND gate 1013 in response to a command Y11·X4·W7·RFT INT. The OR gate 1015 has its output connected to one of the inputs to the AND gate 1011 and responds to the commands RFT SYNC FROM OTHER RPI + NO RFT SYNC. The latter signal is generated by a latch NO RFT SYNC which is set in response to an AND gate 1017 which has its inputs connected respectively to the OR gate 1004 and the conductor NO SYNC. Thus, the latch NO RFT SYNC is set when the RS common logic units are not operating in synchronism and the computer processors have generated the signal RESET RFT. The OR gate 1015 will be energized from the other priority and interrupt control RPI-B by RFT SYNC FROM OTHER RPI when the RS common logic units are operating in synchronism. Thus, the latch RFT IND becomes reset at Y11·X5. The latches NO RFT SYNC and RFT SYNC are reset in response to the setting of the latch RFT INT. Also, it should be noted that the latch RFT SYNC generates a signal RFT SYNC TO OTHER RPI for supplying this information to the priority and interrupt control RPI--B so that it is aware of the resetting of the RFT INT latch in the priority and interrupt control RPI-A. Also, the signal REQUEST FOR TRANSLATION generated by the latch RFT IND, when set, is transferred to the local test panel RLT.

Referring to FIG. 11, there is shown three additional interrupt-generating logic circuits which are utilized in connection with maintenance of the register sender 200. The three additional interrupts shown in FIG. 11 are the error count interrupt 1100, the fault interrupt 1102, and the system trouble interrupt 1104. These three interrupts differ from the request-for-translation interrupt in that the former interrupts are utilized for maintenance purposes and the latter interrupt is used for call processing.

Considering now the error count interrupt 1100, the primary hardware fault detection method used by the register sender 200 is a comparison between certain signals of the synchronously-running memories RCM-A and RCM-B. When a non-comparison occurs or when a secondary detector, such as a parity circuit, designates a failure, the register sender initiates a recycle of the operation. If the recycle is successful, a word designated as the ERROR COUNT WORD is written into the core memory and the error count interrupt 1100 initiates a cycle of operation. If the recycle is unsuccessful, the maintenance controller RMN then initiates a maintenance cycle of operation in which a "-snapshot" is taken of the particular register of the memory to ascertain the source of the problem and to take the necessary steps to correct the situation.

A latch ERR INT is set in response to a signal ERR CT REQ from the maintenance controller RMN for the purpose of requesting an error count interrupt. The latch ERR INT generates a signal ERROR COUNT which is transferred to the computer line processor CLP of the data processor unit 130 and to the local test panel RLT. A latch ERR IND is set in response to the setting of the error interrupt latch ERR INT and generates, when set, a signal ERR CT INT IND which is transferred to the maintenance controller RMN.

Upon the setting of the error interrupt latch, the error sync latch is reset since its reset input is connected to the zero output of the error interrupt latch. An OR gate 1108 has its output connected directly to the reset input of the error interrupt latch to reset it. The OR gate 1108 generates a true output signal in response to a signal RLT RESET ERR CT from the local test panel RLT or from the respective outputs of a pair of AND gates 1111 and 1112. The AND gate 1111 responds to the command A RESET ERR CT·C STROBE-A SEL. The AND gate 1112 responds to the command B RESET ERR CT·C STROBE-B SEL. The signal C STROBE-A SEL is generated by an AND gate 1115 which generates its output signal in response to the command C STROBE-A·CCP–A SELECTED. The signal C STROBE-B SEL is generated by an AND gate 1117 which responds to the command C STROBE-B·CCP–B SELECTED.

A LATCH ERR SYNC is set in response to a signal from an AND gate 1006 which responds to the resetting of the error interrupt latch ERR INT and the time X1·W4. The latch ERR SYNC generates a signal ERR SYNC TO OTHER RPI which is transferred to the priority and interrupt control RPI–B.

An AND gate 1121 has its output directly connected to the reset input of the error indicator latch to reset it. The And gate 1121 is energized in response to the output of an OR gate 1123 and the one output of the error SYNC latch at X1 and W8. The OR gate 1123 is energized in response to a signal ERR SYNC FROM OTHER RPI or the signal NO SYNC. The signal ERR SYNC FROM OTHER RPI is transferred from the priority and interrupt control RPI–B.

Considering now the fault interrupt 1102, this interrupt utilizes the same logic as the logic used in the error count interrupt 1100, and thus the fault interrupt 1102 will not be described in detail. In general, the fault interrupt 1102 is generated when parity circuits (not shown) in the register sender 200 indicate a lack of parity during a particular operation. The fault interrupt 1102 provides a signal RS FAULT to the computer line processor CLP of data processor 130 in response to a signal FLT INT REQ which is transferred from the maintenance controller RMN. As a result, if a lack of parity is recognized, the maintenance controller RMN transfers an interrupt signal to the computer line processor.

The fault interrupt also generates a pair of output signals FAULT INT IND and FLT SYNC TO OTHER RPI which are transferred to the maintenance controller RMN and the priority and interrupt control RPI–B, respectively. For initiating a reset operation for the fault interrupt 1102, there is provided a pair of signals A RESET RS FLT and B RESET RS FLT from the respective decoders A and B. Also, a signal RLT RESET RS FLT is generated by the local test panel RLT for resetting purposes. Likewise, a signal FLT SYNC FROM OTHER RPI is generated by the priority and interrupt control RPI–B for resetting purposes.

Considering now the system trouble interrupt 1104, this interrupt utilizes the same logic as used in the error count interrupt 1100 and the fault interrupt 1102, and thus it will not be described in detail. The system trouble interrupt is utilized to interrupt the processing of the data processor unit 130 when an illogical result of an operation of the register sender 200 occurs. A lack of an acknowledgement of a request from the data processor unit 130 to the register sender 200 during a "handshake" operation is an example of an illogical result to cause the maintenance controller RMN to initiate a system trouble interrupt. The register sender 200 detects system trouble during Y1 to Y4 of a register scanning operation and sets an associated common logic flip-flop (not shown). During Y5 the maintenance controller RMN senses the setting of the flip-flop and examines a system trouble interrupt status flip-flop (not shown) and a system trouble service bit flip-flop (not shown) in the maintenance controller. If neither one of the flip-flops is set, the maintenance controller stores the system trouble word with the proper information from the register and initiates the operation of the system trouble interrupt 1104.

A pair of output signals SYS TBL INT IND and TBL SYNC TO OTHER RPI are generated and transferred to the register controller RMN and to the priority and interrupt control RPI–B, respectively. The signal SYSTEM TROUBLE is transferred to the computer line processor CLP and to the local test panel RLT. In order to reset the latches of the system trouble interrupt 1104, a signal A RESET SYS TBL is generated by the decoder A, and a signal B RESET SYS TBL is generated by the decoder B. A signal RLT RESET SYS TBL is generated by the local test panel RLT to initiate a reset cycle of operation. Also, a signal TBL SYNC FROM OTHER RPI is generated by the priority and interrupt control RPI–B for the purpose of selectively causing a resetting of the system interrupt 1104.

F. MEMORY CONTROL OPERATION

Figure 12:
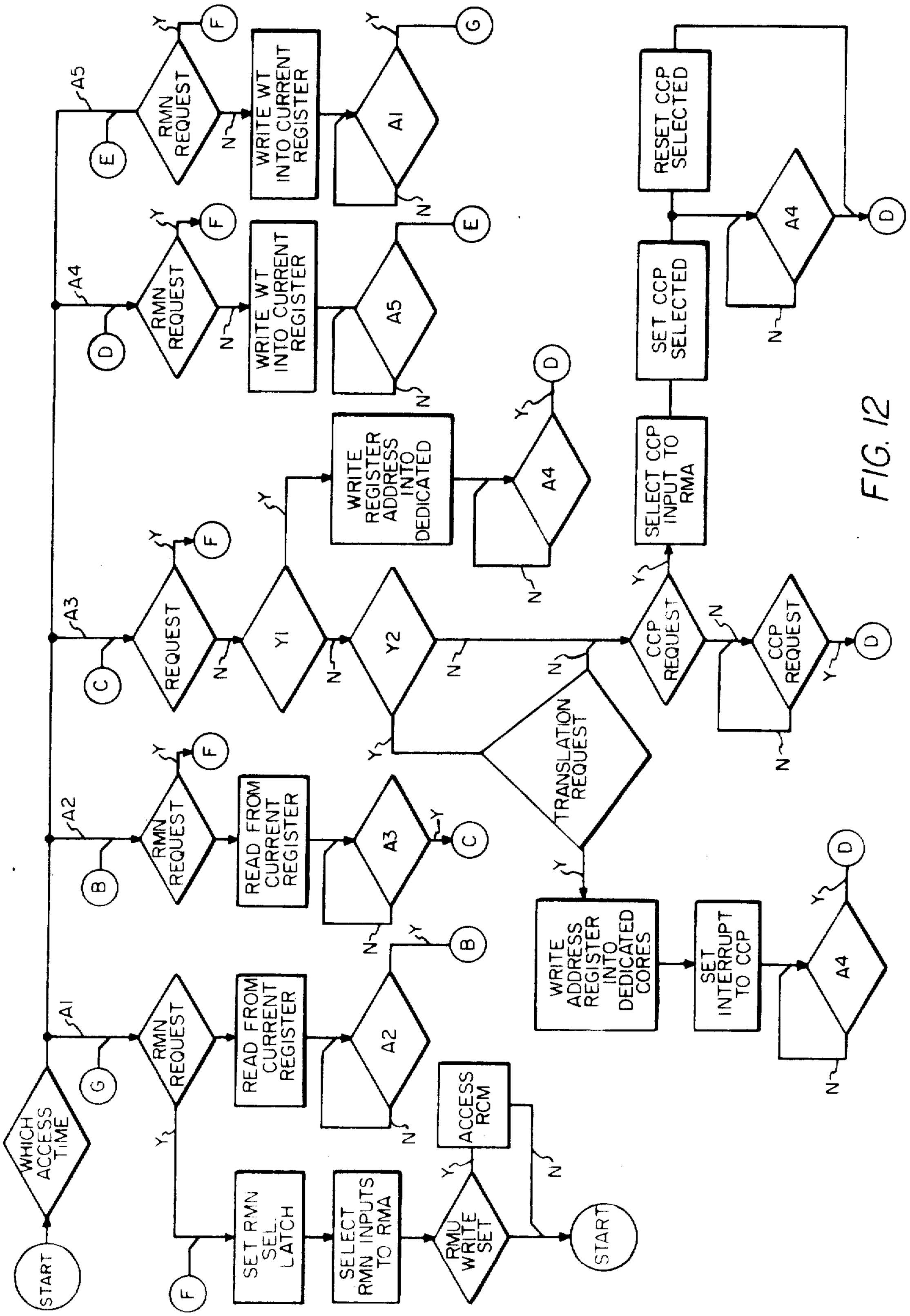
FIGS. 12 and 13 are flow chart diagrams which are useful in understanding the operation of the system.
Figure 13:
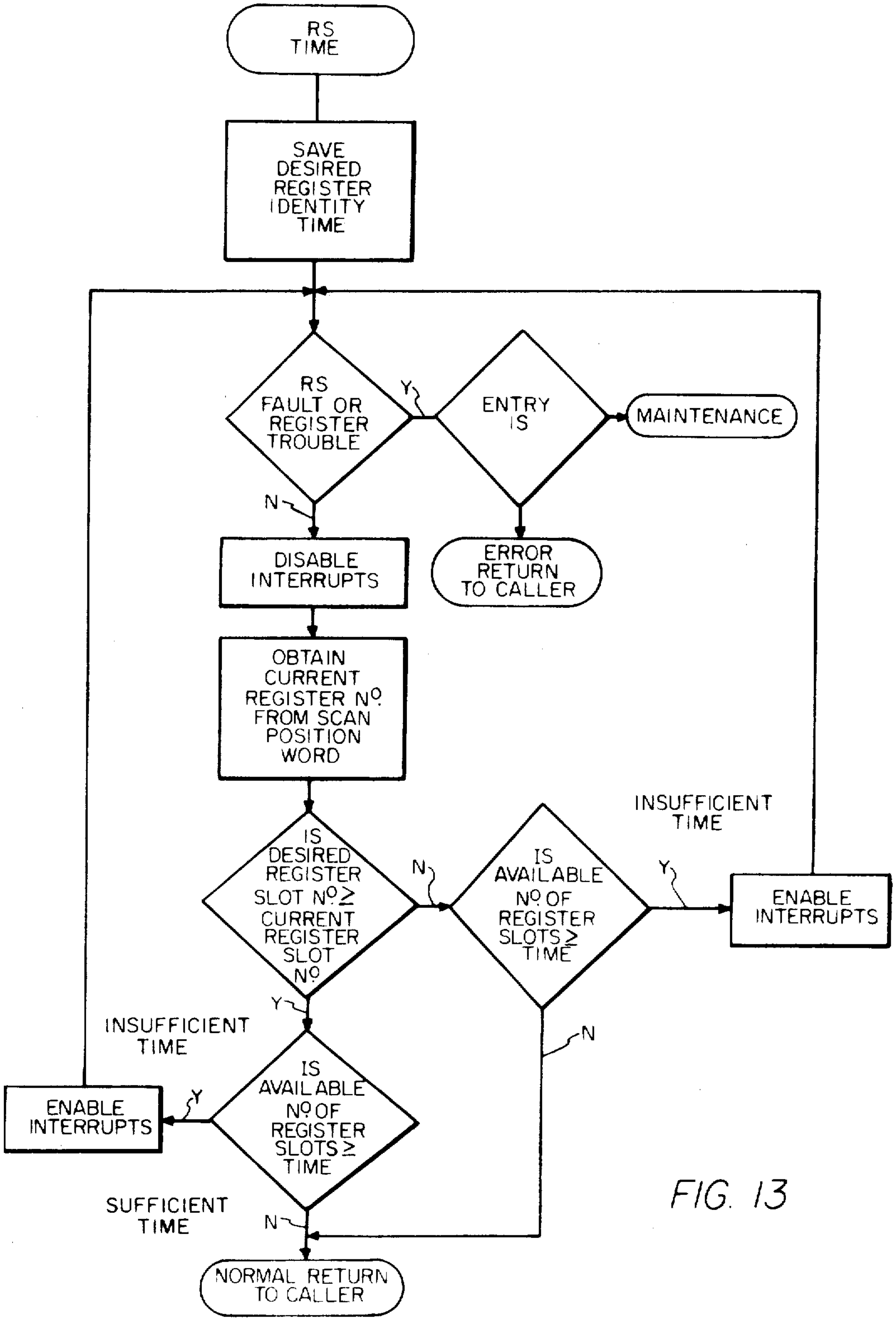

Referring now to FIGS. 12 and 13, there will now be considered the memory control operation of the register sender 200. In this regard, the reading and writing of information into the core memory RCM-A by the write transfer RWT, the computer processor CCP of the data processor unit 130 and the maintenance controller RMN. in FIG. 12, there is shown a flow chart diagram of the operation of the priority and interrupt control RPI for controlling the accessing of the core memory RCM. As shown in FIG. 12, five separate operations are controlled by the priority and interrupt control RPI during the five separate access periods A1 through A5. The reading and writing of information on a time division multiplex basis of the memory RCM by the central control RCC are performed during access times A1, A2, A4 and A5 under the control of the latch MA $\theta$. Each of the five different access times will be described independently.

(1) Access Time A1 — Maintenance Controller Request

Referring now to FIG. 12, assuming the priority and interrupt control RPI is currently operating at the access A1 and a maintenance controller RMN request occurs. Such a request has the highest priority for accessing the memory RCM-A so that a maintenance controller memory-access cycle of operation commences. As shown in FIG. 12, the maintenance controller memory-access cycle of operation commences during any one of the access times A1 through A5 since the maintenance controller receives the highest priority for accessing the memory RCM–A. However, the maintenance controller memory-access cycle of operation will only be described in connection with the first access time.

When the maintenance controller RMN is requested, the maintenance controller latch RMN SEL is set in response to the following command:

X5 EXT·W1·RMN REQ.

Thus, by setting the maintenance controller select latch, the write transfer via the AND gates 8001 and 8013, the computer processors CCP–A and CCP–B via the AND gate 8032 and 8034, and other ones of the select signals are inhibited. The signal RSP DATA $\theta$-23 SEL is generated by the AND gate 8038 in response to the following command:

$\overline{\text{RMU ADRS θ}}$·RMN SEL.

This same command causes the OR gate 8036 to generate the signal RSP DATA SEL. The select signal RSP DATA θ–23 SEL gates the data RSP DATA θ–23 via OR gates 5025 to 5048 to the OR gates 5000 to 5023, whereby the information can be transferred from the maintenance controller RMN to the memory RCM–A. The signal RSP DATA SEL and the signal RMU WRITE from the maintenance controller RMN cause the signal START WRITE to be generated by the AND gate 6244 in response to the OR gates 6248 and 6249 when the signal MEMORY CONTROL SEL is generated by a memory control latch MEM CONT which is set by the or gate 8043.

In order to supply the memory RCM–A with an address for identifying the dedicated core storage area for storing the information RSP DATA θ–23 from the maintenance controller RMN, the AND gate 8028 generates the select signal RMU ADRS SEL in response to the following command:

RMU RTG ADRS SEL·RMN SEL.

The last-mentioned command enables the five AND gates 6268 to 6272 for gating the address information RMU ADRS θ to 4 to the memory RCM–A. The address information RMU ADRS θ to 4 identifies the selected dedicated core storage area of the memory RCM–A. The signal RMU ADRS SEL also energizes the AND gates 7328 to 7334 for transferring the hardware-wired address of the dedicated core storage area to the memory RCM–A by generating the signals RMU ADRS 5 to 11 for energizing their associated OR gates ADRS 5 to 11.

At X1·W8, which is near the end of the first access time period, the memory control latch is reset. Moreover, the maintenance controller selection latch RMN SEL is reset by the following command:

X2·W11·$\overline{\text{RMN REQ}}$ (2) Access Time A1 — Without RMN Request

During the first access time period A1 without a maintenance controller request, the first memory location of the first sub-time slot of a register is accessed to read the information from the memory RCM–A. At X5 EXT·W1, the maintenance controller select latch RMN SEL is reset by the following command:

X5 EXT·W1·$\overline{\text{RMN REQ}}$

Moreover, at X5 EXT·W1 the latch RRB DATA is set by the following command:

X5 EXT·W1.

Thus, the signal RRB SEL is generated by the AND gate 8030 by the following command:

RRB DATA·$\overline{\text{RMN SEL}}$ whereby the signal MUX A READ is generated by the OR gate 6248A to in turn energize the AND gate 6248R and thus to generate the signal START READ for the core memory RCM–A. As a result, the read operation can commence. Moreover, at X5 EXT·W1, the latch MA θ is reset to permit the first or right-hand word of the memory location of the sub-time slot of a register to be accessed. Moreover, at X5 EXT·W1 the write transfer access latch WT ACC is reset so that information is prevented from being written into the memory during the first access time.

At X1·W4 the memory control latch MEM CONT is set. Thus, the signal START READ is generated by the AND gate 6248R in response to the command RRB SEL·MEMORY CONTROL SEL. At X1·W8, the memory control latch is reset to discontinue the control signal START READ.

The address of the location in the memory of the right-hand word is gated to the memory RCM–A in response to the setting of the latch RTG ADRS which is set at X4·W3 at the end of the preceding middle access time period A3. As a result, the select signal RTG ADRS SEL is generated by the OR gate 8020 to transfer the data MA θ–11 to the core memory RCM–A via the OR gates 7282 to 7293 and their associated OR gates 7255 to 7266 which generate the signals ADRS θ to 11. The latch RTG ADRS remains set until X2·W11 at the end of the second access time period A2, at which time the latch RTG ADRS is reset.

(3) Access Time A2

As shown in FIG. 12, during the second access time period A2, a separate cycle of operation is performed and is similar to the type of operation performed during the first access time period A1. The latch RRB DATA remains set until the end of the second access time period and is reset at X2·W11. Thus, both the latch RRB DATA and the latch RTG ADRS remain set during the first and second access time periods. The memory control latch is again set during the second access time period at X2·W3 and is reset at X2·W7 at the end of the second access time period to cause the signal START READ to be generated during the second access time.

(4) Access Time A4

During the access time period A4, as shown in FIG. 12, the priority and interrupt control RPI causes the first or right-hand word to be transferred from the write transfer RWT into the appropriate memory location of a register during a sub-time slot. Assuming that the maintenance controller has not been requested, at X4·W3 which is the beginning of the fourth access time A4, the latches RWT ACC and RTG ADRS are set, and the latch CCP SEL is reset. Thus, the signal RWT SEL A–F is generated by the AND gate 8001 in response to the following command:

WT ACC·$\overline{\text{RMN·MAθ}}$.

Thus, the select signal RWT SEL A–F is generated to transfer the right-hand data RWT DATA A1 to F4 from the write transfer RWT to the right-hand row of the memory location of a register. The select signal RTG ADRS SEL energizes the AND gates 7335 to 7346 to transfer the data signals MA θ to 11 to the memory RCM–A to designate the location of the memory storage location of the right-hand word. At X4·W6 the memory control latch is set to cause the signal START WRITE to be generated, whereby the information is written into the right-hand word memory location during a sub-time slot. At X4·W10, the memory control latch is reset to turn off the signal START WRITE.

(5) Access Time A5

During the access time period A5, the second or left-hand word is written into the appropriate memory location during the same sub-time slot in which the right-hand word is written into the same memory location. As shown in FIG. 12, during the fifth access time a cycle of operation occurs and is similar to the cycle of operation which takes place during the fourth access time. The latches RWT ACC and RTG ADRS remain set until X5 EXT·W1 and X2·W11, respectively, of the following set of access time periods for a subsequent sub-time slot. During the fifth access time, the latch MA 0 is set at X5·W1 and is reset at X5 EXT·W1.

(6) Access Time A3 — Sub-time Slot Y1

As shown in FIG. 12, during the access time period A3, assuming the absence of a maintenance controller request, the address of the currently-scanned register is written into the dedicated cores of the memory RCM-A. During Y1, the signal CURRENT RRJ WORD ADRS SEL is generated by the AND gate 8017 in response to the following command:

$$\overline{RTG\ ADRS}\cdot Y1\cdot \overline{RMN\ SEL}.$$

Also, in response to the signal CURRENT RRJ WORD ADRS SEL, the OR gate 8019 generates the signal RTG DATA SEL to energize the AND gates 5229 to 5235, whereby the data MA4 to 11 is transferred to the memory RCM-A. The data MA4 to 11 designates the address of the currently-scanned register. This signal CURRENT RRJ WORD ADRS SEL energizes the AND gates 7348 to 7359 for the purpose of transferring to the memory RCM-A the hardware-wired address of the dedicated cores, which store the address of the currently-scanned register. The signal RTG DATA SEL causes the signal MUX B WRITE to be generated so that at X3·W3 the memory control latch is set to cause the generation of the control signal START WRITE. At X3·W3 the memory control latch is reset so that the control signal START WRITE ceases to be generated. Thereafter, the cycle of operation for the fourth access time A4 commences.

(7) Access Time A3 — Sub-time Slot Y2

During access time period A3, in the Y2 sub-time slot of a register, a request for translation can occur. When such a request occurs, the signal TRR is generated, and the address of the register requesting the translation is written into the dedicated cores of the core memory RCM-A. Thereafter, the request-for-translation interrupt is generated for requesting the computer processor CCP.

During sub-time slot Y2, when the interrupt signal TRR is generated by the central control RCC-A, the command TRR·Y2 energizes the AND gate 9014 to in turn energize the inverter gate 9016, whereby the AND gate 8035 is inhibited so that the computer processor select latch CCP SEL is prevented from being set. Thus, the computer processor CCP is prevented from accessing the memory during this cycle of operation. The command $Y2\cdot TRR\cdot\overline{RTG\ ADRS}\cdot\overline{RMN\ SEL}$ causes the AND gate 8015 to generate the signal REQ FOR TR WORD ADRS SEL for the purpose of sending the hardware address of the dedicated core storage area to the memory RCM-A so that the address of the register requesting the translation can be stored in the memory. The signal REQ FOR TR WORD ADRS SEL also energizes the AND gates 7361 to 7373 to in turn energize the OR gates 7255 to 7267 so that the hardware-wired address of the dedicated cores can be transferred to the memory RCM-A. Also, the select signal REQ FOR TR WORD ADRS SEL energizes the AND gates 6239 to 6244 for transferring the bits RRB D 4 to L 4 from read buffer RRB to the memory RCM-A. The bits RRB D4 to F1 represent the status of the register requesting the translation.

Moreover, the OR gate 8019 is energized in response to the AND gate 8015 to generate the select signal RTG DATA SEL, whereby the AND gates 5229 to 5235 are energized for the purpose of transferring the bits MA4 to MA11 to the memory RCM-A. The bits MA4 to MA11 contain the address of the currently scanned register.

At X3·W3 the memory control latch is set to energize the AND gate 6244 for the purpose of generating the signal start write in response to the select signal RTG DATA SEL energizing the OR gate 6250 which in turn energizes the OR gate 6248 and the AND gate 6244. The command X3·W3·REQ FOR TR WORD ADRS SEL sets the latches RFT IND and RFT INT of the request-for-translation interrupt as shown in FIG. 10. The signal TRS is generated by the latch RFT IND to signal the central control RCC-A. The signal TRS indicates that the translation request is served, and therefore the translation request is now complete. The latch RFT INT generates the signal REQUEST FOR TRANSLATION which is transferred to the computer line processor CLP for requesting the translation.

At X3·W7 the memory control latch is reset. At X4·W3, which is the beginning of the fourth access time period A4, the latch RTG ADRS is set to energize the OR gate 8020 for the purpose of generating the select signal RTG ADRS SEL. Upon setting the latch RTG ADRS, the AND gate 8015 and thus the OR gate 8019 are disabled, whereby the select signals REQ FOR TR WORD ADRS SEL and RTG DATA SEL become false. However, the latches RFT IND and RFT INT remain set. At the next opportunity the data processor unit 130 can access a desired register during a subsequent middle access time period A3.

(8) Access Time A3 — Computer Processor Syncing

During the middle access time A3, one of the computer processors, such, for example, as the computer processor CCP-A, can access the memory RCM-A. The computer processor CCP-A requests an access of the memory by causing the generation of the signal MEM REQ. In this regard, the memory request signal is generated by the OR gate 9047 in response to the command RS READ-A. CCP-A SELECTED. The latch CCP REQ is then set by means of the AND gate 9045 in response to the command X2·W7·MEM REQ. Thereafter, the latch CCP SYNCED is set in response to the AND gate 9018 which responds to the command X2·W10·CCP REQ·(CCP REQ FROM OTHER RPI + NO SYNC). The latch CCP SEL is then set in response to the command $X2\cdot W11\cdot CCP\ SYNCED\cdot\overline{Y1}\cdot(\overline{Y2\cdot TRR})$. As a result, the AND gate 8032 is energized in response to the command CCP-A SELECTED·RMN SEL·CCP SEL and thus generates the select signal CCP-A SEL to cause the associated data information, control signal, and address information to be transferred by means of the memory access RCM-A to the memory RCM-A. At X3·W3, the memory control latch is set to gate the control signal START READ TO the memory RCM-A, and is reset at X3·W7. At X3·W8 the latch RS DAL, as shown in FIG. 9, is set in response to the command X3·W8·CCP READ·CCP-A SEL. Thus, the data available latch RS DAL indicates to the computer processor CCP that the data is available for reading purposes. When the signal CCP READ becomes false, the latch RS DAL is reset to complete the "-handshake" operation for verification purposes.

Referring now to FIG. 13, there is shown a flow chart diagram of a program performed by the data processor unit 130 to determine whether or not there is a sufficient amount of time for the data processor unit 130 to access a selected register of the register sender 200 prior to the scanning of the selected register during its time slot by the register sender. By comparing the time required for accessing the register with the time required by the register sender 200 to scan sequentially from the currently scanned register to the desired register, the data processor unit 130 can determine whether or not a sufficient amount of time is available. If not, the comparing operation of the program is repeated until data processor unit 130 would have a sufficient amount of time to access the desired register to update it.

Thus, the first operation of the program is to determine the "RS time" which is the time required by the data processor unit 130 to access a desired memory location of a desired register to update it. Next, the identity of the desired register and the RS time are stored. If there are no faults or trouble in the register sender 200, then the interrupts are disabled by resetting the appropriate latches. If there is a fault, then a maintenance cycle of operation has priority and is initiated. If an error occurs, the "error return to caller" operation is then initiated.

After the interrupts are disabled, the time slot of the currently scanned register is obtained from the core memory of the register sender. Thereafter, a determination is made concerning whether the number designating the time slot of the desired register is equal to or greater than the number designating the time slot of the currently scanned register. If it is, then a determination is made concerning whether or not the available number of register time slots is equal to or less than the RS time. In this regard, the available number of register time slots refers to the time available for accessing the desired register and is equal to the number designating the time slot of the desired register minus the number designating the currently scanned register's time slot, the difference being multiplied by 49.5 $\mu$seconds, which is the time of each time slot. If the available time is insufficient for accessing the desired register, then the interrupts are enabled and the program is repeated until a sufficient amount of time becomes available. If the time is sufficient, then the "-normal-return-to-caller" condition occurs, and the register may be accessed.

If the number designating the time slot of the desired register is less than the number designating the time slot of the currently scanned register, a determination is made concerning whether or not the available number of register time slots is equal to or greater than the RS time. In this regard, the available number of time slots again refers to the time available for accessing the desired register, but it is equal to 202 (total number of sequentially-accessible registers) plus the number designating the desired register minus the number designating the currently-scanned register, this quantity being multiplied by 49.5 $\mu$seconds. If the available time is equal to or less than the RS time, then the interrupts are enabled and the program is repeated until a sufficient amount of time becomes available for accessing the desired register. If the time is sufficient, then the "normal-return-to-caller" condition occurs.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. Memory access control apparatus for a digital processing system usable in a communication switching system comprising a register subsystem and a central processing unit; wherein the register subsystem includes a memory, a plurality of register junctors, a read buffer, common logic circuits, write transfer circuits, multiplex circuits coupling the register junctors to the common logic circuits, a timing generator, and said memory access control apparatus;

said memory comprises a plurality of word stores, each of which comprises a given number of storage elements, with an individual address for each word store; with register blocks in said memory comprising N times M of said word stores, some of said blocks being sequentially accessed register blocks and other register blocks;

said timing generator comprises means to supply pulses for a plurality of cyclically recurring time slots, pulses for N sub-time slots recurring each time slot, and pulses for a fixed number of intervals recurring each sub-time slot, with outputs supplying the time slot pulses to the memory access control apparatus and to the multiplex circuits, and supplying the sub-time slot and interval pulses to the memory access control apparatus and to the common logic circuits;

a timing device (MAO) having M states;

wherein the individual address of each word store of each sequentially accessed register block comprises a time slot output designating the register block, a sub-time slot output designating a set of M word stores corresponding to N, and one of said M states of the timing device, as a sequential address;

memory address, data, read control and write control conductors coupling outputs of the memory access control apparatus to the memory; memory output conductors coupling data output of the memory to the read buffer and to the central processing unit, write conductors coupling outputs of the write transfer circuits to inputs of the memory access control apparatus, sequential address conductors coupling outputs of the timing generator and the timing device to inputs of the memory access control apparatus, and processor address, data and control conductors from the central processing unit coupled to inputs of the memory access control apparatus;

said memory access control apparatus comprises means using said intervals from the timing generator to divide each sub-time slot into a sequential access read period followed by a middle access period which is followed by a sequential access write period, and to operate the timing device through its states in sequence during both the sequential access read period and the sequential access write period; means to gate the sequential address on the sequential address conductors from the timing generator and the timing device to the memory address conductors during both the sequential access read period and the sequential access write period, means to supply signals to the memory on the memory read control conductor during the sequential access read period and on the memory write control conductor during the sequential access write period, means to load data from the memory output conductors into the read buffer during the sequential access read period, so that data from a set of word stores for a sub-time slot is read from the memory into the read buffer during the sequential access read period and remains therein during the middle access period and the sequential access write period, and the data possibly modified by the common logic circuits is written into the same set of word stores during the sequential access write period;

said memory access control apparatus further comprises register identification means effective during said middle access period to gate a current address comprising at least the time slot identity from the timing generator to the data conductors to the memory, to supply a signal on the write control conductor, and to supply a given address to the address conductors to the memory, said given address being for a word store in one of said other register blocks, so that the current address is written into the word store at said given address for use by the central processing unit;

said memory access control apparatus further comprises processor access mean effective during said middle access period to selectively gate signals on said process address, data and control conductors to the memory data, address and read control or write control conductors to read or write in memory with random access to any one of said word stores in accordance with the signals from the central processing unit;

priority means pęrmitting only one means including the register identification means and processor access means to have access to gate signals to the memory during the middle access period of any sub-time slot.

2. Memory access control apparatus as claimed in claim 1, wherein said register subsystem includes call processing apparatus;

said memory access control apparatus includes call-for-service means, comprising a request-control gate (8015) and translation interrupt bistable means;

a request-signal lead connected from the call processing apparatus to an input of the request-control gate, connections from the request-control gate to the translation interrupt bistable means and also to said register identification means, a call lead coupled from an output of the translation interrupt bistable means to said central processing unit and a busy indication lead coupled from an output of the translation interrupt bistable means;

the call-for-service means being responsive to a request signal on the request-signal lead to actuate the register identification means and also to set the translation interrupt bistable means so that said current address written into the word store at said given address identifies a register block requesting service while a call signal appears on said call lead to the central processing unit and a busy signal on the busy indication lead is supplied to the call processing apparatus for use in preventing a request signal for another register block;

and means responsive to a reset signal condition from said central processing unit to reset said translation interrupt bistable means.

3. Memory access control apparatus as claimed in claim 2, including further register identification means effective during said middle access period of the first sub-time slot of each time slot to gate the current address comprising at least the time slot identity from the timing generator to the data conductors, in the memory, to supply a signal on the write control conductor, and to supply another given address to the address conductors to the memory, said other given address being for another word store in one of said other register blocks, so that the current address is written into the word store at said other given address for use by the central processing unit to determine when it may access the register subsystem without conflict with the sequential access in the same register block;

and wherein in said call-for-service means said request-control gate includes an input from the timing generator for a sub-time slot other than the first, so that it may respond to the request signal only during that sub-time slot.

4. Memory access control apparatus as claimed in claim 3, wherein said register subsystem further includes maintenance control apparatus;

said memory access control apparatus includes a plurality of maintenance interrupt means, each of which includes bistable means with an input from the maintenance control apparatus to set it and outputs coupled to the central processing unit and to the maintenance control apparatus to indicate when it is set, and each maintenance interrupt means having means to reset its bistable means in response to a reset signal condition from the central processing unit;

maintenance address data and control conductors from the maintenance control apparatus coupled to inputs of the memory access control apparatus;

and said memory access control apparatus further comprises maintenance access means to selectively gate signals on said maintenance address, data and control conductors to the memory data, address and write control conductors with random access to predetermined word stores in accordance with the signals from the maintenance control apparatus;

whereby maintenance data from the register subsystem may be placed in word stores of the memory and a signal sent to the central processing unit from the maintenance interrupt means so that the central processing unit may subsequently request access and read the maintenance data.

* * * * *

UNITED STATES PATENT OFFICE

CERTIFICATE OF CORRECTION

Patent No. 3,729,715 Dated April 24, 1973

Inventor(s) Charles Kenneth Buedel

It is certified that error appears in the above-identified patent and that said Letters Patent are hereby corrected as shown below:

Column 41, line 16, after "its" add -- M --

Column 42, line 34, omit "comma (,)" after conductors

Column 42, line 34, after conductors delete "in" and add -- to --.

Signed and sealed this 25th day of December 1973.

(SEAL)
Attest:

EDWARD M.FLETCHER,JR.
Attesting Officer

RENE D. TEGTMEYER
Acting Commissioner of Patents